United States Patent
Misra et al.

(10) Patent No.: US 11,487,694 B1
(45) Date of Patent: Nov. 1, 2022

(54) HOT-PLUG EVENTS IN A POOL OF RECONFIGURABLE DATA FLOW RESOURCES

(71) Applicant: SambaNova Systems, Inc., Palo Alto, CA (US)

(72) Inventors: Anand Misra, Fremont, CA (US); Conrad Alexander Turlik, Menlo Park, CA (US); Maran Wilson, Palo Alto, CA (US); Anand Vayyala, San Jose, CA (US); Raghu Shenbagam, San Jose, CA (US); Ranen Chatterjee, Fremont, CA (US); Pushkar Shridhar Nandkar, Santa Clara, CA (US); Shivam Raikundalia, Palo Alto, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 0 days.

(21) Appl. No.: 17/554,913

(22) Filed: Dec. 17, 2021

(51) Int. Cl.
*G06F 13/40* (2006.01)
*G06F 9/50* (2006.01)

(52) U.S. Cl.
CPC ........ *G06F 13/4081* (2013.01); *G06F 9/5011* (2013.01)

(58) Field of Classification Search
None
See application file for complete search history.

(56) References Cited

U.S. PATENT DOCUMENTS

| 5,560,029 A | 9/1996 | Papadopoulos et al. |
| 5,794,033 A | 8/1998 | Aldebert et al. |

(Continued)

FOREIGN PATENT DOCUMENTS

| CN | 107636625 A | 1/2018 |
| EP | 0733234 A1 | 9/1996 |

(Continued)

OTHER PUBLICATIONS

Podobas et al., A Survey on Coarse-Grained Reconfigurable Architectures From a Performance Perspective, IEEEAccess, vol. 2020. 3012084, Jul. 27, 2020, 25 pages.

(Continued)

*Primary Examiner* — David E Martinez
(74) *Attorney, Agent, or Firm* — Flagship Patents; Sikander Khan

(57) ABSTRACT

A data processing system comprises a pool of reconfigurable data flow resources with arrays of physical configurable units, a controller, and a runtime processor. The controller is configured to generate a hot-plug event in response to detecting a removal of an unallocated array of physical configurable units from the pool of reconfigurable data flow resources. The runtime processor is configured to execute user applications on a subset of the arrays of physical configurable units and to receive the hot-plug event from the controller. The runtime processor is further configured to make the removed unallocated array of physical configurable units unavailable for subsequent allocations of subsequent virtual data flow resources and subsequent executions of subsequent user applications, while the subset of the arrays of physical configurable units continues the execution of the user applications.

21 Claims, 11 Drawing Sheets

(56) References Cited

U.S. PATENT DOCUMENTS

| | | |
|---|---|---|
| 5,963,746 A | 10/1999 | Barker et al. |
| 6,105,119 A | 8/2000 | Kerr et al. |
| 6,119,181 A | 9/2000 | Vorbach et al. |
| 6,728,871 B1 | 4/2004 | Vorbach et al. |
| 7,952,387 B1 | 5/2011 | Frazer |
| 7,996,684 B2 | 8/2011 | Wasson et al. |
| 8,006,021 B1 | 8/2011 | Li et al. |
| 8,045,546 B1 | 10/2011 | Bao et al. |
| 8,261,042 B2 | 9/2012 | Kanstein et al. |
| 8,656,141 B1 | 2/2014 | Agarwal |
| 9,158,575 B2 | 10/2015 | Smith |
| 9,411,532 B2 | 8/2016 | Vorbach et al. |
| 9,569,214 B2 | 2/2017 | Govindu et al. |
| 9,690,747 B2 | 6/2017 | Vorbach et al. |
| 9,697,318 B2 | 7/2017 | Hutton et al. |
| 9,875,105 B2 | 1/2018 | Rozas et al. |
| 10,037,227 B2 | 7/2018 | Therien et al. |
| 10,229,017 B1 * | 3/2019 | Zou ................ G06F 11/2007 |
| 10,698,853 B1 | 6/2020 | Grohoski et al. |
| 10,831,507 B2 | 11/2020 | Shah et al. |
| 11,055,141 B2 | 7/2021 | Prabhakar et al. |
| 11,188,497 B2 | 11/2021 | Shah et al. |
| 11,237,996 B2 | 2/2022 | Grohoski et al. |
| 2001/0047509 A1 | 11/2001 | Mason et al. |
| 2004/0049672 A1 | 3/2004 | Nollet et al. |
| 2004/0153608 A1 | 8/2004 | Vorbach et al. |
| 2005/0091468 A1 | 4/2005 | Morita et al. |
| 2006/0010306 A1 | 1/2006 | Saito et al. |
| 2007/0046326 A1 | 3/2007 | Fujisawa et al. |
| 2007/0180172 A1 | 8/2007 | Schmidt et al. |
| 2009/0113169 A1 | 4/2009 | Yang et al. |
| 2009/0113422 A1 * | 4/2009 | Kani .................. G06F 9/5077 718/1 |
| 2009/0135739 A1 | 5/2009 | Hoover et al. |
| 2010/0161309 A1 | 6/2010 | Chartraire et al. |
| 2010/0268862 A1 | 10/2010 | Park et al. |
| 2012/0126851 A1 | 5/2012 | Kelem et al. |
| 2012/0131257 A1 | 5/2012 | Rudosky et al. |
| 2013/0024621 A1 | 1/2013 | Choi et al. |
| 2013/0227255 A1 | 8/2013 | Kim |
| 2013/0326190 A1 | 12/2013 | Chung et al. |
| 2014/0237227 A1 | 8/2014 | Aizawa |
| 2014/0317628 A1 | 10/2014 | Kim |
| 2014/0331031 A1 | 11/2014 | Suh et al. |
| 2015/0347192 A1 | 12/2015 | Blaine et al. |
| 2017/0083313 A1 | 3/2017 | Sankaralingam et al. |
| 2017/0105130 A1 | 4/2017 | Chen et al. |
| 2017/0123794 A1 | 5/2017 | Chen et al. |
| 2017/0161204 A1 | 6/2017 | Roberts et al. |
| 2017/0185564 A1 | 6/2017 | Toichi |
| 2017/0317678 A1 | 11/2017 | Code et al. |
| 2017/0357500 A1 * | 12/2017 | Vidyadhara ............. G06F 8/656 |
| 2018/0089117 A1 | 3/2018 | Nicol |
| 2018/0121121 A1 | 5/2018 | Mehra et al. |
| 2018/0157825 A1 | 6/2018 | Eksten et al. |
| 2018/0189231 A1 | 7/2018 | Fleming, Jr. et al. |
| 2018/0275193 A1 | 9/2018 | Rouge et al. |
| 2018/0349098 A1 | 12/2018 | Manohararajah |
| 2019/0042513 A1 | 2/2019 | Fleming, Jr. et al. |
| 2019/0042924 A1 | 2/2019 | Pasca et al. |
| 2019/0056969 A1 | 2/2019 | Khandros et al. |
| 2019/0084296 A1 | 3/2019 | Shaul et al. |
| 2019/0147323 A1 | 5/2019 | Li et al. |
| 2019/0171604 A1 | 6/2019 | Brewer |
| 2019/0205734 A1 | 7/2019 | Guntoro |
| 2019/0213153 A1 | 7/2019 | Pan et al. |
| 2019/0303297 A1 | 10/2019 | Fleming, Jr. et al. |
| 2019/0317770 A1 | 10/2019 | Sankaralingam et al. |
| 2020/0125396 A1 | 4/2020 | Chynoweth et al. |
| 2020/0159544 A1 | 5/2020 | Shah et al. |
| 2021/0055940 A1 | 2/2021 | Shah et al. |
| 2021/0141675 A1 * | 5/2021 | Yang .................... G06F 9/5016 |

FOREIGN PATENT DOCUMENTS

| | | |
|---|---|---|
| EP | 1372084 A2 | 12/2003 |
| EP | 2441013 B1 | 8/2014 |
| TW | 200801964 A | 1/2008 |
| TW | 200928736 A | 7/2009 |
| TW | 201346758 A | 11/2013 |
| TW | I502510 B | 10/2015 |
| TW | 201610708 A | 3/2016 |
| TW | 201730761 A | 9/2017 |
| TW | 201833767 A | 9/2018 |
| WO | 2010142987 A1 | 12/2010 |

OTHER PUBLICATIONS

M. Emani e tal., "Accelerating Scientific Applications With SambaNova Reconfigurable Dataflow Architecture," in Computing in Science & Engineering, vol. 23, No. 2, pp. 114-119, Mar. 1-Apr. 2021, doi: 10.1109/MCSE.2021.3057203.

Anonymous, Activation Function, Wikipedia, Retrieved on Dec. 3, 2021, 5 pages. Retrieved from [ URL: https://en.wikipedia.org/wiki/Activation_function ].

AMBA AXI and ACE Protocol Specification, ARM, as early as Jan. 2003, 440 pages.

80.192.25.230: "Producer-consumer problem", Feb. 7, 2013 (Feb. 7, 2013), XP055530821, Retrieved from the Internet: URL:https://en.wikipedia.org/w/index.php?t>itle=Producer%E2%80%93consumer_problem&oldid=537111527[retrieved on Dec. 6, 2018], 4 pages.

Ando et al., "A Multithreaded CGRA for Convolutional Neural Network Processing," Scientific Research Publishing, Circuits and Systems, Jun. 2017, pp. 149-170.

Basterretxea et al., "Approximation of sigmoid function and the derivative for hardware implementation of artificial neurons," IEE Proceedings—Circuits, Devices and Systems, vol. 151, Issue 1, Feb. 5, 2004, 7 pages.

Benoit et al: "Automatic Task Scheduling/ Loop Unrolling using Dedicated RTR Controllers in Coarse Grain Reconfigurable Architectures", Parallel and Distributed Processing Symposium, 2005. Proceedings. 19th IEEE International Denver, CO, USA Apr. 4-8, 2005, Piscataway, NJ, USA,IEEE, Apr. 4, 2005 (Apr. 4, 2005), pp. 148a-148a, XP010785667, DOI: 10.1109/IPDPS.2005.119, ISBN: 978-0-7695-2312-5, 8 pages.

De Sutter et al., "Coarse-Grained Reconfigurable Array Architectures," 2010 Handbook of Signal Processing Systems, 37 pages.

Eppler et al. ,"High speed neural network chip for trigger purposes in high energy physics," IEEE, Proc, of the conference on design, automation and test in Europe, Feb. 1998, 8 pages.

Fiolhais et al., "Overlay Architectures for Space Applications," SpacE FPGA Users Workshop, Apr. 9-11, 2018, pp. 1-20.

Gomar et al. "Precise digital implementations of hyperbolic tanh and sigmoid function," 2016 50th Asilomar Conference on Signals, Systems and Computers, Nov. 6-9, 2016, 4 pages.

Harris et al., "Architectures and Algorithms for User Customization of CNNs," ASP-DAC 2018, 32 pages.

Hartenstein, "Coarse Grain Reconfigurable Architectures," IEEE, 2001, 6 pages.

Iannucci, "Toward a dataflow/von Neumann hybrid architecture," ISCA '88 Proc. of the 15th Annual ISCA, May 30-Jun. 2, 1988, 10 pages.

Jafri et al., "NeuroCGRA: A CGRAs with Support for Neural Networks," 2014 International Conference on High Performance Computing & Simulation (HPCS), 8 pages.

Koeplinger et al., Spatial: A Language and Compiler for Application Accelerators, Proceedings of the 39th ACM SIGPLAN Conference on Programming Language Design And Embodiment (PLDI), Proceedings of the 43rd International Symposium on Computer Architecture, 2018.

Li, et al., "Caterpillar: Coarse Grain Reconfigurable Architecture for Accelerating the Training of Deep Neural Networks," arXiv: 1706.00517v2 [cs.DC], Jun. 8, 2017, 10 pages.

Lin et al., "A Digital Circuit Design of Hyperbolic Tangent Sigmoid Function for Neural Networks," 2018 IEEE Int'l Symp. on Circuits and Systems, May 18-21, 2018, 4 pages.

(56) References Cited

OTHER PUBLICATIONS

Nicol, "A Course Grain Reconfigurable Array (CGRA) for Statically Scheduled Data Flow Computing," Wave Computing, May 3, 2017, 9 pages.
Nicol, "Wave Computing: A Dataflow Processing Chip for Training Deep Neural Networks," 2017, 25 pages.
Paek et al., "Binary Acceleration Using Coarse-Grained Reconfigurable Architecture," ACM SIGARCH Computer Architecture News, vol. 38, No. 4, Sep. 2010, 7 pages.
PCT-US2020-012079 International Preliminary Report on Patentability, dated May 7, 2021, 14 pages.
PCT/US2019/062287—International Search Report and Written Opinion dated Feb. 5, 2020, 18 pages.
PCT/US2019/062287—Response to Chapter II, Sep. 1, 2020, 17pgs.
PCT/US2019/062289—International Search Report and Written Opinion dated Feb. 28, 2020, 14 pages.
PCT/US2019/062289—Response to Chapter II Demand, Sep. 15, 2020, 11 pages.
PCT/US2020/012079—International Search Report and Written Opinion dated Apr. 29, 2020, 18 pages.
PCT/US2020/012079 Response to Chapter II Demand, Nov. 3, 2020, 25 pages.
PCT/US2020/040832—International Search Report and the Written Opinion dated Sep. 18, 2020, 18 pages.
PCT/US2020/32186—International Search Report and Written Opinion dated Aug. 14, 2020; 21 pages.
Prabhakar et al., "Plasticine: A Reconfigurable Architecture for Parallel Patterns", ISCA '17, Jun. 24-28, 2017, Toronto, ON, Canada.
Tanomoto et al., "A CGRA-based Approach for Accelerating Convolutional Neural Networks," 2015 IEEE 9th International Symposium on Embedded Multicore/Many-core Systems-on-Chip, 2015, pp. 73-80.
Tobuschat, et al., "IDAMC: A NoC for mixed criticality systems," 2013 IEEE 19th International Conference on Embedded and Real-Time Computing Systems and Applications, Taipei, Aug. 19-21, 2013, pp. 149-156.
Turkson et al. "Artificial neural network applications in the calibration of spark-ignition engines: An overview," Engineering Science and Technology, an International Journal, vol. 19, Issue 3, Sep. 2016, 1346-1359.
TW 108148376—Notice of Allowance dated Oct. 23, 2020, 5 pages.
TW 108148376—Request for Exam and Voluntary Amendment filed Jun. 30, 2020, 17 pages.
U.S. Appl. No. 16/197,826—Notice of Allowance dated May 18, 2020, 22 pages.
U.S. Appl. No. 16/197,826—Notice of Allowance dated Jun. 29, 2020, 11 pages.
U.S. Appl. No. 16/198,086—Notice of Allowance dated Jan. 15, 2021, 23 pages.
U.S. Appl. No. 16/239,252—Notice of Allowance dated Feb. 12, 2020, 10 pages.
U.S. Appl. No. 16/239,252—Notice of Allowance dated May 14, 2020, 15 pages.
U.S. Appl. No. 16/239,252—Office Action dated Aug. 7, 2019, 8 pages.
U.S. Appl. No. 16/239,252—Response to Final Office Action dated Jan. 8, 2020, filed Jan. 24, 2020, 14 pages.
U.S. Appl. No. 16/862,445—Office Action dated Mar. 18, 2021, 25 pages.
U.S. Appl. No. 16/504,627 Office Action dated Nov. 13, 2020, 8 pages.
U.S. Appl. No. 16/407,675 Office Action, dated May 18, 2020, 9 pages.
U.S. Appl. No. 16/407,675—Office Action dated Oct. 29, 2020, 7 pages.
U.S. Appl. No. 16/504,627 Office Action dated Feb. 12, 2021, 10 pages.

Vadivel et al., "Loop Overhead Reduction Techniques for Coarse Grained Reconfigurable Architectures," ResearchGate, Conference Paper, Aug. 2017, https://www.researchgate.net/publication/319416458, 9 pages.
Vranjkovic et al., "Coarse-Grained Reconfigurable Hardware Accelerator of Machine Learning Classifiers," IWSSIP 2016, The 23rd International Conference on Systems, Signals and Image Processing, May 23-25, 2016, Bratislava, Slovakia, 5 pages.
Wang, et al., "Reconfigurable Hardware Accelerators: Opportunities, Trends and Challenges," Cornell University, Dec. 13, 2017, 25 pages.
Wentzlaff et al: "On-Chip Interconnection Architecture of the Tile Processor", IEEE Micro, IEEE Service Center, Los Alamitos, CA, US, vol. 27, No. 5, Sep. 1, 2007 (Sep. 1, 2007), pp. 15-31, XP011196754.
Wijtvliet et al., "Coarse Grained Reconfigurable Architectures in the Past 25 Years: Overview and Classification," IEEE 2016, pp. 235-244.
Wijtvliet, Course Syllabus for "Accelerators and Coarse Grained Reconfigurable Architectures," Advanced School for Computing and Imaging, 2017, 2 pages.
Zhang, "Design of Coarse-Grained Reconfigurable Architecture for Digital Signal Processing," Implementation Aspects, Master of Science Thesis, Feb. 2009, 110 pages.
U.S. Appl. No. 16/504,627—Notice of Allowance dated Apr. 16, 2021, 26 pages.
U.S. Appl. No. 16/862,445 Response to Office Action dated Mar. 18, 2021, filed Jun. 9, 2021, 12 pages.
U.S. Appl. No. 16/198,086—Notice of Allowance (after RCE) dated Jun. 28, 2021, 9 pages.
PCT/US2019/062287 International Preliminary Report on Patentability, dated Feb. 19, 2021, 31 pages.
U.S. Appl. No. 16/407,675—Notice of Allowance dated Jun. 1, 2021, 7 pages.
PCT/US2019/062289—International Preliminary Report on Patentability dated Feb. 19, 2021, 27 pages.
TW 109114892—First Office Action dated Jul. 22, 2021, 7 pages.
PCT/US2020/032186—3rd Party Observation dated Jul. 13, 2021, 20 pages.
PCT/US2020/040832—3rd Party Observation dated Jul. 12, 2021, 20 pages.
U.S. Appl. No. 16/407,675 Response to Final Office Action dated Oct. 29, 2020, filed Dec. 23, 2020, 8 pages.
U.S. Appl. No. 16/407,675 Response to First Office Action dated May 18, 2020, filed Jul. 10, 2020, 11 pages.
U.S. Appl. No. 16/504,627 Response to Non-Final Office Action dated Nov. 13, 2020, filed Feb. 2, 2021, 6 pages.
TW 109122772—First Office Action dated Aug. 27, 2021, 11 pages.
PCT/US2020/012079—Second Article 34 Amendment (Response to Informal Communication by Telephone) dated Feb. 2, 2021, as filed on Apr. 2, 2021, 5 pages.
U.S. Appl. No. 16/504,627—312 Amendment in response to Notice of Allowance dated Apr. 16, 2021 filed May 17, 2021, 22 pages.
CA-3120683 Office Action, dated Sep. 1, 2021, 3 pages.
U.S. Appl. No. 16/862,445 Notice of Allowance, dated Sep. 17, 2021, 15 pages.
U.S. Appl. No. 17/093,543 Office Action dated Oct. 12, 2021, 20 pages.
TW 108142191—First Office Action dated, Nov. 3, 2021, 17 pages.
EP 207029398 Rules 161(1) and 162 Communication, dated Aug. 18, 2021, 3 pages.
CA 3120683 Voluntary Amendments, dated Aug. 4, 2021, 9 pages.
EP 198213613 Rules 161(1) and 162 Communication, dated Jul. 1, 2021, 3 pages.
PCT/US2020/032186 International Preliminary Report on Patentability, dated Nov. 18, 2021, 15 pages.
TW 109114892—Response to First Office Action dated Jul. 22, 2021, filed Oct. 26, 2021, 16 pages.
U.S. Appl. No. 16/239,252 Final Office Action, dated Jan. 8, 2020, 13 pages.
U.S. Appl. No. 16/239,252—Response to Office Action dated Aug. 7, 2019, filed Sep. 26, 2019, 6 pages.

(56) References Cited

OTHER PUBLICATIONS

CN 2020800135801—Voluntary Amendments with translation, dated Jan. 3, 2022, 16 pages.
EP 20702339.8 Response to Rules 161(1) and 162 Communication, filed Feb. 25, 2022, 10 pages.
TW 108142191—Response to First Office Action dated Nov. 3, 2021, filed Jan. 26, 2022, 9 pages.
TW 108142191—Notice of Allowance, dated Feb. 21, 2022, 2 pages.
U.S. Appl. No. 17/093,543—Response to Office Action dated Oct. 12, 2021, filed Jan. 20, 2022, 4 pages.
CA 3120683—Response to First Office Action dated Sep. 1, 2021, filed Dec. 31, 2021, 4 pages.
EP 198213613—Response to Rules 161(1) and 162 Communication dated Jul. 1, 2021, filed Jan. 11, 2022, 12 pages.
EP 19829712.9—Rules 161(1) and 162 Communication, dated Jun. 30, 2021, 3 pages.
EP 19829712.9—Response to Rules 161(1) and 162 Communication dated Jun. 30, 2021, filed Jan. 10, 2022, 11 pages.
U.S. Appl. No. 16/407,675 Notice of Allowance dated Mar. 14, 2022, 12 pages.
U.S. Appl. No. 17/093,543—Office Action dated Apr. 19, 2022, 32 pages.
CA 3120683—Notice of Allowance dated Feb. 17, 2022, 1 page.
TW 110101760—First Office Action dated Mar. 29, 2022, 12 pages.
TW 109114892—Notice of Allowance, dated Apr. 11, 2022, 3 pages.
PCT/US2020/040832—International Preliminary Report on Patentability, dated Jan. 20, 2022, 16 pages.
EP 20743938.1—Rules 161(1) and 162 Communication, dated Feb. 15, 2022, 3 pages.

* cited by examiner

HOT-PLUG EVENTS IN A POOL OF RECONFIGURABLE DATA FLOW RESOURCES

INCORPORATIONS

The following are incorporated by reference for all purposes as if fully set forth herein:

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language And Compiler For Application Accelerators," *Proceedings Of The* 39*th ACM SIGPLAN Conference On Programming Language Design And Embodiment* (PLDI), Proceedings of the 43rd International Symposium on Computer Architecture, 2018;

U.S. Nonprovisional patent application Ser. No. 16/239, 252, filed Jan. 3, 2019, entitled, "VIRTUALIZATION OF A RECONFIGURABLE DATA PROCESSOR";

U.S. Nonprovisional patent application Ser. No. 16/197, 826, filed Nov. 21, 2018, entitled, "CONFIGURATION LOAD OF A RECONFIGURABLE DATA PROCESSOR";

U.S. Nonprovisional patent application Ser. No. 16/198, 086, filed Nov. 21, 2018, entitled, "CONFIGURATION UNLOAD OF A RECONFIGURABLE DATA PROCESSOR";

U.S. Nonprovisional patent application Ser. No. 16/260, 548, filed Jan. 29, 2019, entitled, "MATRIX NORMAL/TRANSPOSE READ AND A RECONFIGURABLE DATA PROCESSOR INCLUDING SAME";

U.S. Nonprovisional patent application Ser. No. 16/536, 192, filed Aug. 8, 2019, entitled, "COMPILER FLOW LOGIC FOR RECONFIGURABLE ARCHITECTURES";

U.S. Nonprovisional patent application Ser. No. 16/407, 675, filed May 9, 2019, entitled, "CONTROL FLOW BARRIER AND RECONFIGURABLE DATA PROCESSOR";

U.S. Nonprovisional patent application Ser. No. 16/504, 627, filed Jul. 8, 2019, entitled, "QUIESCE RECONFIGURABLE DATA PROCESSOR";

U.S. Nonprovisional patent application Ser. No. 16/572, 516, filed Sep. 16, 2019, entitled, "EFFICIENT EXECUTION OF OPERATION UNIT GRAPHS ON RECONFIGURABLE ARCHITECTURES BASED ON USER SPECIFICATION";

U.S. Nonprovisional patent application Ser. No. 16/744, 077, filed Jan. 15, 2020, entitled, "COMPUTATIONALLY EFFICIENT SOFTMAX LOSS GRADIENT BACKPROPAGATION";

U.S. Nonprovisional patent application Ser. No. 16/590, 058, filed Oct. 1, 2019, entitled, "COMPUTATION UNITS FOR FUNCTIONS BASED ON LOOKUP TABLES";

U.S. Nonprovisional patent application Ser. No. 16/695, 138, filed Nov. 25, 2019, entitled, "COMPUTATION UNITS FOR BATCH NORMALIZATION";

U.S. Nonprovisional patent application Ser. No. 16/688, 069, filed Nov. 19, 2019, entitled, "LOOK-UP TABLE WITH INPUT OFFSETTING";

U.S. Nonprovisional patent application Ser. No. 16/718, 094, filed Dec. 17, 2019, entitled, "COMPUTATION UNITS FOR ELEMENT APPROXIMATION";

U.S. Nonprovisional patent application Ser. No. 16/560, 057, filed Sep. 4, 2019, entitled, "SIGMOID FUNCTION IN HARDWARE AND A RECONFIGURABLE DATA PROCESSOR INCLUDING SAME";

U.S. Nonprovisional patent application Ser. No. 16/572, 527, filed Sep. 16, 2019, entitled, "PERFORMANCE ESTIMATION-BASED RESOURCE ALLOCATION FOR RECONFIGURABLE ARCHITECTURES";

U.S. Nonprovisional patent application Ser. No. 15/930, 381, filed May 12, 2020, entitled, "COMPUTATIONALLY EFFICIENT GENERAL MATRIX-MATRIX MULTIPLICATION (GeMM)";

U.S. Nonprovisional patent application Ser. No. 16/890, 841, filed Jun. 2, 2020, entitled, "ANTI-CONGESTION FLOW CONTROL FOR RECONFIGURABLE PROCESSORS"; and U.S. Nonprovisional patent application Ser. No. 16/922, 975, filed Jul. 7, 2020, entitled, "RUNTIME VIRTUALIZATION OF RECONFIGURABLE DATA FLOW RESOURCES".

FIELD OF THE TECHNOLOGY DISCLOSED

The present technology relates to hot-plug events in a pool of reconfigurable data flow resources, and more particularly to the hot-plug removal of reconfigurable data flow resources from the pool of reconfigurable data flow resources and/or the hot-plug insertion of reconfigurable data flow resources to the pool of reconfigurable data flow resources. Such hot-plug events in the pool of reconfigurable data flow resources is particularly applicable to cloud offering of coarse-grained reconfigurable architectures (CGRAs).

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Virtualization has enabled the efficient scaling and sharing of compute resources in the cloud, adapting to changing user needs at runtime. Users are offered a view of an application service with management of resources hidden from view, or alternatively abstracted development platforms for deploying applications that can adapt to changing needs. The flexibility, scalability, and affordability offered by cloud computing are fundamental to the massively connected compute paradigm of the future. However, virtualization of resources, complex communication, and fluctuations in computational demands can make running complex applications challenging. And, as the performance of server class processors has stuttered, alternative strategies for scaling performance are being explored.

Applications are migrating to the cloud in search of scalability, resilience, and cost-efficiency. At the same time, silicon scaling has stalled, precipitating a wave of new specialized hardware accelerators such as tensor processing units (TPUs), intelligence processing units (IPUs), on-demand graphics processing units (GPU), and field programmable gate arrays (FPGA) support from cloud providers. Accelerators have driven the success of emerging application domains in the cloud, but cloud computing and hardware specialization are on a collision course. Cloud applications run on virtual infrastructure, but practical virtualization support for accelerators has yet to arrive. Cloud providers routinely support accelerators but do so using peripheral component interconnect express (PCIe) pass-through techniques that dedicate physical hardware to virtual machines (VMs). Multi-tenancy and consolidation are lost as a consequence, which leads to hardware underutilization.

The problem is increasingly urgent, as runtime systems have not kept pace with accelerator innovation. Specialized hardware and frameworks emerge far faster than the runtime systems support them, and the gap is widening. Runtime-driven accelerator virtualization requires substantial engineering effort and the design space features multiple fundamental tradeoffs for which a sweet spot has remained elusive.

Practical virtualization must support sharing and isolation under flexible policy with minimal overhead. The structure of accelerator stacks makes this combination extremely difficult to achieve. Accelerator stacks are silos comprising proprietary layers communicating through memory mapped interfaces. This opaque organization makes it impractical to interpose intermediate layers to form an efficient and compatible virtualization boundary. The remaining interposable interfaces leave designers with untenable alternatives that sacrifice critical virtualization properties such as interposition and compatibility.

Reconfigurable processors have emerged as a contender for cloud accelerators, combining significant computational capabilities with an architecture more amenable to virtualization, and a lower power footprint. A key strength of reconfigurable processors is the ability to modify their operation at runtime, as well as the ease with which they can be safely partitioned for sharing. Reconfigurable processors, including FPGAs, can be configured to implement a variety of functions more efficiently or faster than might be achieved using a general purpose processor executing a computer program. So-called coarse-grained reconfigurable architectures (CGRAs) are being developed in which the configurable units in the array are more complex than used in typical, more fine-grained FPGAs, and may enable faster or more efficient execution of various classes of functions. For example, CGRAs have been proposed that can enable implementation of energy-efficient accelerators for machine learning and artificial intelligence workloads.

Reconfigurable processors provide low-latency and energy-efficient solutions for deep neural network inference applications. However, as deep learning accelerators, reconfigurable processors are optimized to provide high performance for single-task and static-workload scenarios, which conflict with the multi-tenancy and dynamic resource allocation requirements of cloud computing.

Recently, systems have emerged that provide virtualized reconfigurable processors that support multi-client and dynamic-workload scenarios in the cloud. Such systems typically include multiple interconnected reconfigurable processors, whereby the reconfigurable processors include arrays of configurable units and memory that are allocated to the virtualized reconfigurable processors and execute user applications. The operation of these system usually requires reliability and non-stop operation as well as short downtimes.

In some scenarios, one or more of the reconfigurable processors need to be taken offline. For example, a fault may occur in one of the reconfigurable processors, and the faulty reconfigurable processor needs to be replaced, or regularly-scheduled diagnostics need to be performed on a reconfigurable processor.

In other scenarios, one or more reconfigurable processors need to be added to the multiple interconnected reconfigurable processor. For example, new reconfigurable processors need to be added to the system, or a reconfigurable processor is added to the system after the completion of the regularly-scheduled diagnostics.

It is desirable therefore to provide support for dynamic removal and/or dynamic insertion of reconfigurable processors from and/or to the system without shutting down the entire system and ensuring the correct operation of the other parts of the system during and after the dynamic removal and/or the dynamic insertion of reconfigurable processors.

SUMMARY

A technology is described which enables removal and addition of Coarse-Grained Reconfigurable Array (CGRA) processors that include programmable elements in arrays partitionable into subarrays, and other types of reconfigurable processors from and to a pool of such Coarse-Grained Reconfigurable Array processors.

A data processing system is described that comprises a pool of reconfigurable data flow resources, a controller, and a runtime processor. Reconfigurable data flow resources in the pool of reconfigurable data flow resources include arrays of physical configurable units. The controller is connected to the pool of reconfigurable data flow resources and configured to generate a hot-plug event in response to detecting a removal of at least one array of physical configurable units of the arrays of physical configurable units from the pool of reconfigurable data flow resources.

The runtime processor is connected to the controller and operatively coupled to the pool of reconfigurable data flow resources. The runtime processor is configured to receive a plurality of configuration files for user applications. Configuration files in the plurality of configuration files include configurations of virtual data flow resources required to execute the user applications.

The runtime processor is also configured to allocate a subset of the arrays of physical configurable units in the pool of reconfigurable data flow resources to the virtual data flow resources, and to load the configuration files to the subset of the arrays of physical configurable units. The runtime processor is further configured to start execution of the user applications on the subset of the arrays of physical configurable units.

The runtime processor is configured to receive the hot-plug event from the controller, whereby the hot-plug event indicates the removal of the at least one array of physical configurable units from the pool of reconfigurable data flow resources, whereby the at least one array of physical configurable units is unallocated. The runtime processor is further configured to make the at least one array of physical configurable units unavailable for subsequent allocations of subsequent virtual data flow resources and subsequent executions of subsequent user applications, while the subset of the arrays of physical configurable units continues the execution of the user applications.

The removal of the at least one array of physical configurable units of the arrays of physical configurable units from the pool of reconfigurable data flow resources is reactive to an error event in the at least one array of physical configurable units.

Illustratively, the controller is configured to generate an additional hot-plug event in response to detecting an addition of an other array of physical configurable units to the pool of reconfigurable data flow resources. The other array of physical configurable units is at least one of a previously removed array of physical configurable units from the pool of reconfigurable data flow resources or a newly added array of physical configurable units. The runtime processor is further configured to receive the additional hot-plug event from the controller indicating the addition of the other array of physical configurable units to the pool of reconfigurable data flow resources, wherein the other array of physical configurable units is unallocated. In addition, the runtime processor may be configured to make the other array of physical configurable units available for the subsequent allocations of the subsequent virtual data flow resources and the subsequent executions of the subsequent user applications, while the subset of physical configurable units continues execution of the user applications.

The additional hot-plug event is transmitted to a module in the runtime processor as an interrupt, and the module is configured to respond to the interrupt by executing an initialization of clocks, bus interfaces, and memory resources of the other array of physical configurable units.

The module is further configured to respond to the interrupt by transmitting a file descriptor data structure using an input-output control (IOCTL) system call. The file descriptor data structure specifies the initialization of the clocks, the bus interfaces, and the memory resources of the other array of physical configurable units.

The bus interfaces include at least one of a peripheral component interconnect express (PCIe) channel, a direct memory access (DMA) channel, a double data rate (DDR) channel, an InfiniBand channel, or an Ethernet channel.

The memory resources include at least one of a main memory, a local secondary storage, or a remote secondary storage.

According to one aspect, the controller is configured to generate an additional hot-plug event in response to detecting an addition of a virtual function on an initialized array of physical configurable units in the pool of reconfigurable data flow resources, and the runtime processor is further configured to receive the additional hot-plug event from the controller indicating the addition of the virtual function on the initialized array of physical configurable units in the pool of reconfigurable data flow resources and make the virtual function available for the subsequent allocation of the subsequent virtual data flow resources and the subsequent execution of the subsequent user applications, while the subset of physical configurable units continues execution of the user applications.

If desired, the virtual function is initialized using a single-root input-output virtualization (SR-IOV) interface.

The additional hot-plug event may be transmitted to a module in the runtime processor as an interrupt. If desired, the module is configured to respond to the interrupt by executing an initialization of the virtual function, and transmitting a file descriptor data structure using an input-output control (IOCTL) system call, whereby the file descriptor data structure specifies the initialization of the virtual function.

By way of example, the controller is configured to generate an additional hot-plug event in response to detecting a removal of an allocated array of physical configurable units from the subset of physical configurable units. Illustratively, the runtime processor is further configured to receive the additional hot-plug event from the controller indicating the removal of the allocated array of physical configurable units from the subset of physical configurable units, stop the execution of one or more of the user applications on the allocated array of physical configurable units, and make the allocated array of physical configurable units unavailable for the subsequent allocation of the subsequent virtual data flow resources and the subsequent execution of the subsequent user applications, while other allocated arrays of physical configurable units in the subset of physical configurable units continue the execution of the user applications.

The additional hot-plug event may be transmitted to a module in the runtime processor as an interrupt, and the module may be configured to respond to the interrupt by transmitting a file descriptor data structure using an input-output control (IOCTL) system call. The file descriptor data structure specifies that the allocated array of physical configurable units is unavailable for the subsequent allocation of the subsequent virtual data flow resources and the subsequent execution of the subsequent user applications.

According to one aspect, the controller is configured to generate an additional hot-plug event in response to detecting a removal of an allocated array of physical configurable units that implements an allocated virtual function. The runtime processor may be further configured to receive the additional hot-plug event from the controller indicating the removal of the allocated array of physical configurable units that implements the allocated virtual function, stop the execution of one or more of the user applications on the allocated virtual function, and make the allocated virtual function unavailable for the subsequent allocation of the subsequent virtual data flow resources and the subsequent execution of the subsequent user applications, while other allocated arrays of physical configurable units in the subset of physical configurable units continue the execution of the user applications.

The additional hot-plug event is transmitted to a module in the runtime processor as an interrupt, and the module is configured to respond to the interrupt by transmitting a file descriptor data structure using an input-output control (IOCTL) system call. Illustratively, the file descriptor data structure specifies that the allocated virtual function is unavailable for the subsequent allocation of the subsequent virtual data flow resources and the subsequent execution of the subsequent user applications.

Illustratively, the runtime processor includes a daemon module, a kernel module, and a fault management module. The fault management module is configured to determine that a memory resource of a plurality of memory resources of an allocated array of physical configurable units in the pool of reconfigurable data flow resources is in a faulty state, and transmit a file descriptor data structure to the kernel module using an input-output control (IOCTL) system call. The file descriptor data structure specifies that the memory resource of the plurality of memory resources of the allocated array of physical configurable units in the pool of reconfigurable data flow resources is in the faulty state.

If desired, the kernel module is configured to respond to the IOCTL system call by putting the allocated array of physical configurable units in a drain mode. In the drain mode, after the execution of one or more of the user applications on the allocated array of physical configurable units, the kernel module removes the allocated array of physical configurable units from the pool of reconfigurable data flow resources, thereby transforming the allocated array of physical configurable units into an unavailable array of physical configurable units that is unavailable for the subsequent allocation of the subsequent virtual data flow resources and the subsequent execution of the subsequent user applications.

By way of example, the kernel module is configured to transmit an interrupt to the daemon module. The interrupt may request a reconfiguration of the plurality of memory resources of the unavailable array of physical configurable units without the memory resource that is in the faulty state.

The daemon module is configured to execute the reconfiguration of the plurality of memory resources of the unavailable array of physical configurable units without the memory resource that is in the faulty state.

If desired, the daemon module is further configured to transmit a file descriptor data structure to the kernel module using an input-output control (IOCTL) system call, wherein the file descriptor data structure specifies the reconfiguration of the plurality of memory resources of the unavailable array of physical configurable units.

Illustratively, the kernel module is configured to respond to the IOCTL system call by adding the unavailable array of physical configurable units back into the pool of reconfigurable data flow resources, thereby transforming the unavailable array of physical configurable units into an available array of physical configurable units that is available for the subsequent allocation of the subsequent virtual data flow resources and the subsequent execution of the subsequent user applications.

A data processing system is described that comprises a pool of reconfigurable data flow resources and a runtime processor. The pool of reconfigurable data flow resources may have a plurality of reconfigurable processors, and memory. The runtime processor is connected to the pool of reconfigurable data flow resources, and configured to provide unified access to the plurality of reconfigurable processors via a file system. The file system is configured as a rollup file structure representation of the plurality of reconfigurable processors into a root device directory. In addition, the file system is configured to decouple the root device directory from changes to the pool of reconfigurable data flow resources. Such changes include a removal of at least one reconfigurable processor of the plurality of reconfigurable processors from the pool of reconfigurable data flow resources.

If desired, the changes may further include an addition of at least one of a previously removed reconfigurable processor or an additional reconfigurable processor to the pool of reconfigurable data flow resources.

A system is described that comprises a controller, a runtime processor, a plurality of reconfigurable devices, a plurality of transfer resources that interconnects the plurality of reconfigurable devices and enables the plurality of reconfigurable devices to receive and send data, and a plurality of storage resources usable by the plurality of reconfigurable devices to store data. The controller is connected to the plurality of transfer resources and configured to generate a hot-plug event in response to detecting a removal of at least one reconfigurable device of the plurality of reconfigurable devices from the plurality of transfer resources.

The runtime processor is configured with logic to control execution of a plurality of application graphs based on an execution file, the execution file including configuration files for application graphs in the plurality of application graphs, reconfigurable devices in the plurality of reconfigurable devices required to load and execute the configuration files, and resource requests for transfer resources in the plurality of transfer resources and storage resources in the plurality of storage resources required to satisfy data and control dependencies of the application graphs. The runtime processor is further configured with logic to allocate the reconfigurable devices to the application graphs, allocate the transfer resources and the storage resources to the application graphs based on the resource requests, load the configuration files to the reconfigurable devices, and start execution of the configuration files using the reconfigurable devices, transfer resources, and storage resources. In addition, the runtime processor is configured with logic to receive the hot-plug event from the controller indicating the removal of the at least one reconfigurable device from the plurality of transfer resources, whereby the at least one reconfigurable device is unallocated. Furthermore, the runtime processor is configured with logic to make the at least one reconfigurable device unavailable for subsequent allocations to subsequent application graphs, while the reconfigurable devices, the transfer resources, and the storage resources continue the execution of the configuration files.

Other aspects and advantages of the technology described herein can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Figure 1:
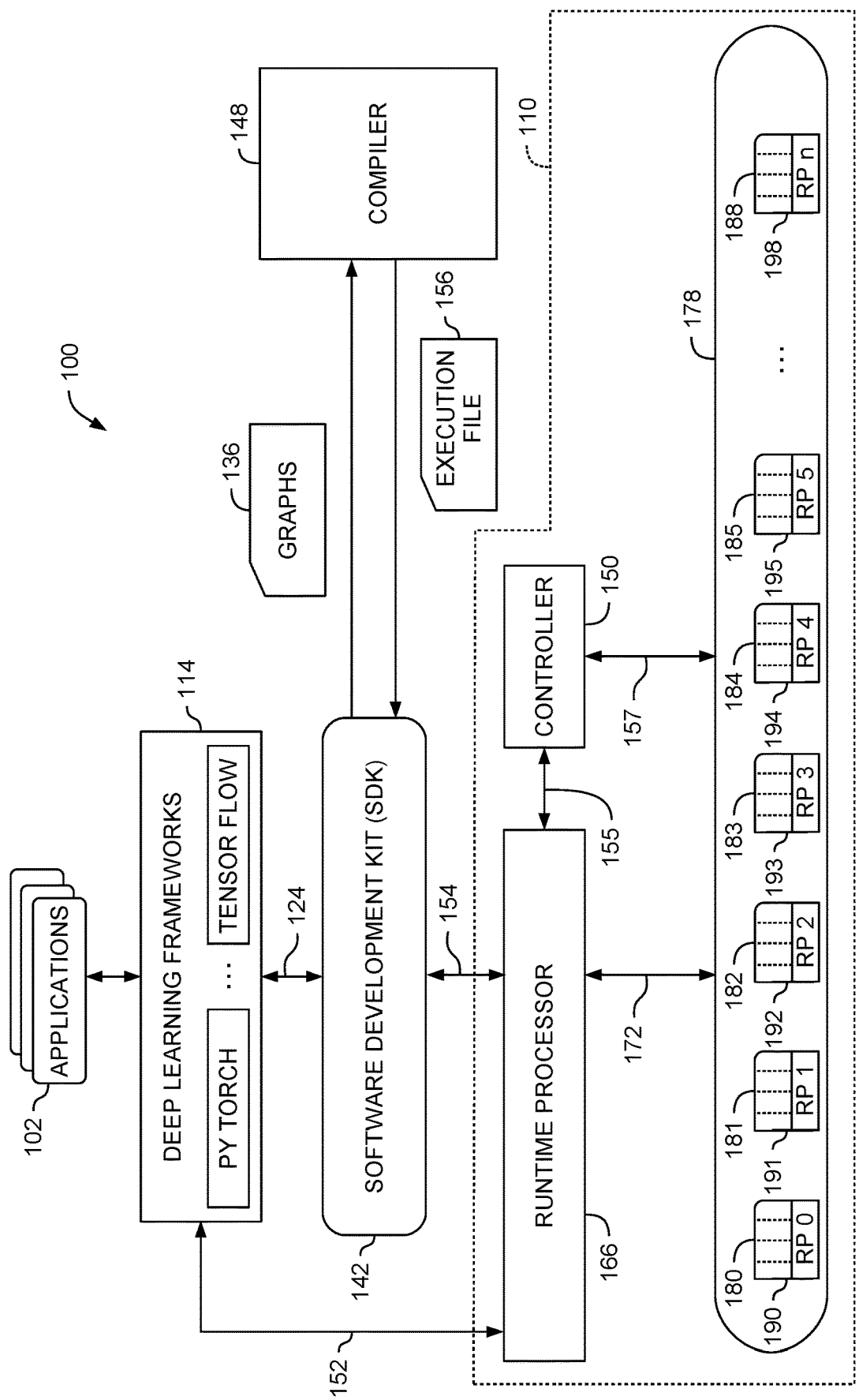
FIG. 1 is a diagram of an illustrative compute environment in which applications are provided a unified interface to a pool of reconfigurable data flow resources such that the pool of reconfigurable data flow resources is available to the applications as a single reconfigurable processor and in which a controller is detecting removal and/or addition of a reconfigurable device from and/or to the pool of reconfigurable data flow resources in accordance with the disclosed technology.

FIG. 1 shows a compute environment 100 that provides on-demand network access to a pool of reconfigurable data flow resources 178 that can be rapidly provisioned and released with minimal management effort or service provider interaction. Reconfigurable data flow resources 180, 181, 182, 183, 184, 185, 188 in the pool of reconfigurable data flow resources 178 include reconfigurable devices such as reconfigurable processors. A reconfigurable processor includes arrays of physical configurable units 190, 191, 192, 193, 194, 195, 198 (e.g., compute units and memory units) in a programmable interconnect fabric. The arrays of physical configurable units in a reconfigurable processor are partitionable into a plurality of subsets (or tiles) of arrays of physical configurable units. Additional details about the architecture of the reconfigurable processors are discussed later in using FIGS. 6, 7, 8A, and 8B.

The pool of reconfigurable data flow resources 178 also includes bus (or transfer) resources that interconnect the reconfigurable devices and enables the reconfigurable devices to receive and send data. Examples of the bus resources include PCIe channels, DMA channels, and DDR channels. The pool of reconfigurable data flow resources 178 also includes memory (or storage) resources usable by the plurality of reconfigurable devices to store data. Examples of the memory resources include main memory (e.g., off-chip/external DRAM), local secondary storage (e.g., local disks (e.g., HDD, SSD)), and remote secondary storage (e.g., distributed file systems, web servers). Other examples of the memory resources include latches, registers, and caches (e.g., SRAM). The pool of reconfigurable data flow resources 178 is dynamically scalable to meet the performance objectives required by applications 102 (or user applications 102). The applications 102 access the pool of reconfigurable data flow resources 178 over one or more networks (e.g., Internet).

Figure 5:
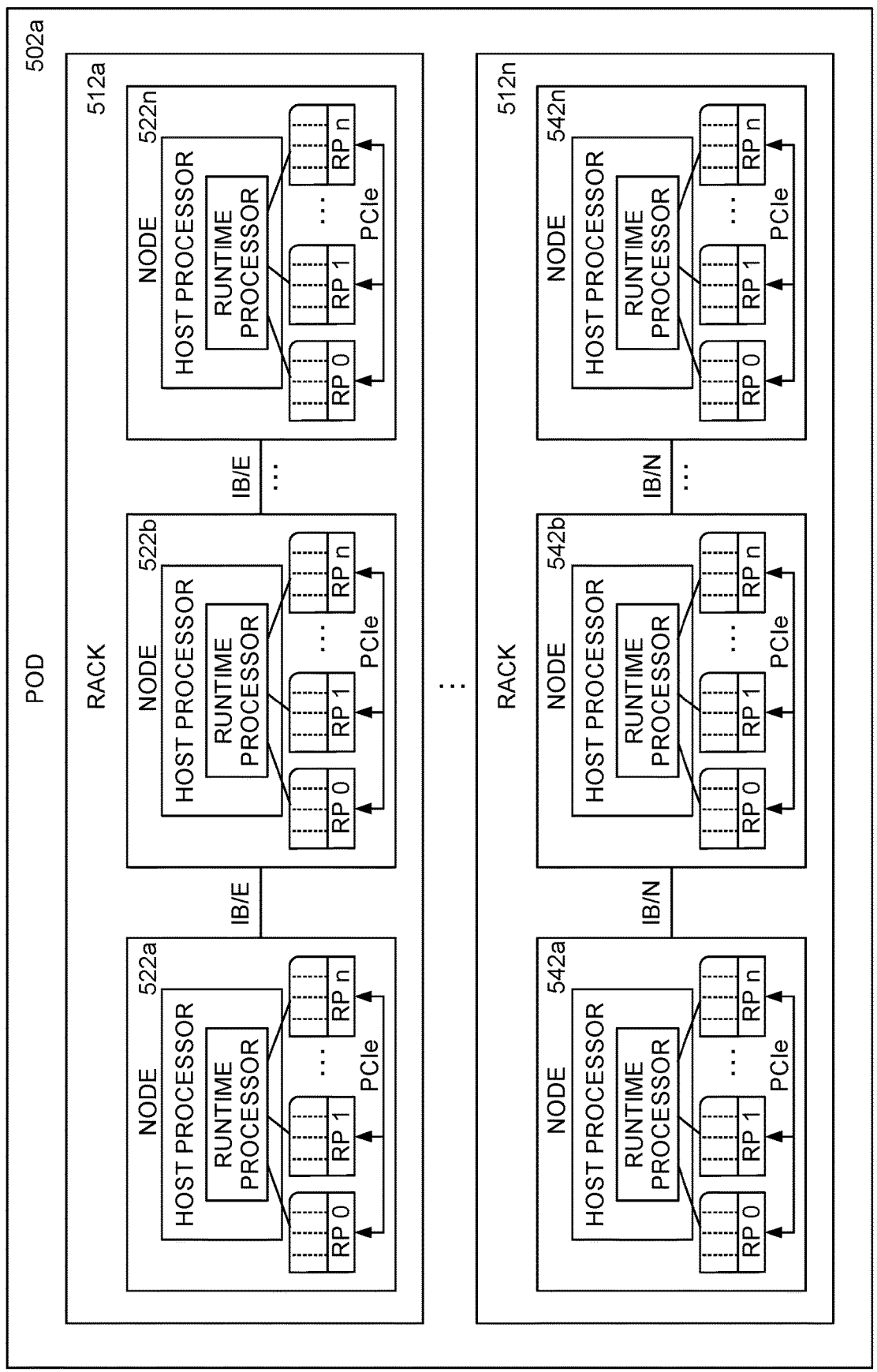
FIG. 5 is a diagram of illustrative compute scales and hierarchies that form the pool of reconfigurable data flow resources according to the technology disclosed.

FIG. 5 shows different compute scales and hierarchies that form the pool of reconfigurable data flow resources 178 according to different implementations of the technology disclosed. In one example, the pool of reconfigurable data flow resources 178 is a node (or a single machine) (e.g., 522a, 522b, . . . , 522n, 542a, 542b, . . . , 542n) that runs a plurality of reconfigurable processors, supported by required bus and memory resources. The node also includes a host processor (e.g., CPU) that exchanges data with the plurality of reconfigurable processors, for example, over a PCIe interface. The host processor includes a runtime processor that manages resource allocation, memory mapping, and execution of the configuration files for applications requesting execution from the host processor. In another example, the pool of reconfigurable data flow resources 178 is a rack (or cluster) (e.g., 512a, . . . , 512n) of nodes (e.g., 522a, 522b, . . . , 522n, 542a, 542b, . . . , 542n), such that each node in the rack runs a respective plurality of reconfigurable processors, and includes a respective host processor configured with a respective runtime processor. The runtime processors are distributed across the nodes and communicate with each other so that they have unified access to the reconfigurable processors attached not just to their own node on which they run, but also to the reconfigurable processors attached to every other node in the data center.

The nodes in the rack are connected, for example, over Ethernet or InfiniBand (IB). In yet another example, the pool of reconfigurable data flow resources 178 is a pod (e.g., 502a) that comprises a plurality of racks. In yet another example, the pool of reconfigurable data flow resources 178 is a superpod that comprises a plurality of pods. In yet another example, the pool of reconfigurable data flow resources 178 is a zone that comprises a plurality of superpods. In yet another example, the pool of reconfigurable data flow resources 178 is a data center that comprises a plurality of zones.

The applications 102 are executed on the reconfigurable processors in a distributed fashion by programming the individual compute and memory components to asynchronously receive, process, and send data and control information. In the reconfigurable processors, computation can be executed as deep, nested dataflow pipelines that exploit nested parallelism and data locality very efficiently. These dataflow pipelines contain several stages of computation, where each stage reads data from one or more input buffers with an irregular memory access pattern, performs computations on the data while using one or more internal buffers to store and retrieve intermediate results, and produce outputs that are written to one or more output buffers. The structure of these pipelines depends on the control and dataflow graph representing the application. Pipelines can be arbitrarily nested and looped within each other.

The applications 102 comprise high-level programs. A high-level program may include source code written in programming languages like C, C++, Java, JavaScript, Python, and/or Spatial, for example, using deep learning frameworks 114 such as PyTorch, TensorFlow, ONNX, Caffe, and/or Keras. The high-level program can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and/or Transformer-XL.

In one example, the high-level program can implement a convolutional neural network with several processing layers, such that each processing layer can include one or more nested loops. The high-level program can execute irregular memory operations that involve accessing inputs and weights and performing matrix multiplications between the inputs and the weights. The high-level program can include nested loops with high iteration count and loop bodies that load and multiply input values from a preceding processing layer with weights of a succeeding processing layer to produce an output for the succeeding processing layer. The high-level program can have loop-level parallelism of the outermost loop body, which can be exploited using coarse-grained pipelining. The high-level program can have instruction-level parallelism of the innermost loop body, which can be exploited using loop unrolling, SIMD vectorization, and pipelining.

Regarding loops in the high-level programs of the applications 102, loops directly nested in a loop body are termed the child loops of the outer parent loop. A loop is called an innermost loop if it does not have any children, i.e., there are no nested loops within its body. A loop is an outermost loop if it does not have a parent, i.e., it is not nested within another loop's body. An imperfectly nested loop has a body with a mix of non-looping statements (e.g., primitive arithmetic, logical, and relational operations) and one or more child loops. Parallelism in the imperfectly nested loops can be exploited at any or all loop levels, and in the operations that comprise loop bodies. Parallelism can occur in multiple forms such as fine-grained and coarse-grained pipeline parallelism, data parallelism, and task parallelism.

Software development kit (SDK) 142 generates computation graphs (e.g., data flow graphs, control graphs) 136 of the high-level programs of the applications 102. The SDK 142 transforms the input behavioral description of the high-level programs into an intermediate representation such as the computation graphs 136. This may include code optimization steps like false data dependency elimination, dead-code elimination, and constant folding. The computation graphs 136 encode the data and control dependencies of the high-level programs.

The computation graphs 136 comprise nodes and edges. The nodes can represent compute operations and memory allocations. The edges can represent data flow and flow control. In some implementations, each loop in the high-level programs can be represented as a "controller" in the computation graphs 136. The computation graphs 136 support branches, loops, function calls, and other variations of control dependencies. In some implementations, after the computation graphs 136 are generated, additional analyses or optimizations focused on loop transformations can be performed, such as loop unrolling, loop pipelining, loop fission/fusion, and loop tiling.

The SDK 142 also supports programming the reconfigurable processors in the pool of reconfigurable data flow resources 178 at multiple levels, for example, from the high-level deep learning frameworks 114 to C++ and assembly language. In some implementations, the SDK 142 allows programmers to develop code that runs directly on the reconfigurable processors. In other implementations, the SDK 142 provides libraries that contain predefined functions like linear algebra operations, element-wise tensor operations, non-linearities, and reductions required for creating, executing, and profiling the computation graphs 136 on the reconfigurable processors. The SDK 142 communicates with the deep learning frameworks 114 via Application Programming Interfaces (APIs) 124.

A compiler 148 transforms the computation graphs 136 into a hardware-specific configuration, which is specified in an execution file 156 generated by the compiler 148. In one implementation, the compiler 148 partitions the computation graphs 136 into memory allocations and execution fragments, and these partitions are specified in the execution file 156. Execution fragments represent operations on data. An execution fragment can comprise portions of a program representing an amount of work. An execution fragment can comprise computations encompassed by a set of loops, a set of graph nodes, or some other unit of work that requires synchronization. An execution fragment can comprise a fixed or variable amount of work, as needed by the program. Different ones of the execution fragments can contain different amounts of computation. Execution fragments can represent parallel patterns or portions of parallel patterns and are executable asynchronously.

In some implementations, the partitioning of the computation graphs 136 into the execution fragments includes treating calculations within at least one innermost loop of a nested loop of the computation graphs 136 as a separate execution fragment. In other implementations, the partitioning of the computation graphs 136 into the execution fragments includes treating calculations of an outer loop around the innermost loop of the computation graphs 136 as a separate execution fragment. In the case of imperfectly nested loops, operations within a loop body up to the beginning of a nested loop within that loop body are grouped together as a separate execution fragment.

Memory allocations represent the creation of logical memory spaces in on-chip and/or off-chip memories for data required to implement the computation graphs 136, and these memory allocations are specified in the execution file 156. Memory allocations define the type and the number of hardware resources (functional units, storage, or connectivity components). Main memory (e.g., DRAM) is off-chip memory for which the memory allocations can be made. Scratchpad memory (e.g., SRAM) is on-chip memory for which the memory allocations can be made. Other memory types for which the memory allocations can be made for various access patterns and layouts include read-only lookup-tables (LUTs), fixed size queues (e.g., FIFOs), and register files.

The compiler 148 binds memory allocations to virtual memory units and binds execution fragments to virtual compute units, and these bindings are specified in the execution file 156. In some implementations, the compiler 148 partitions execution fragments into memory fragments and compute fragments, and these partitions are specified in the execution file 156.

A memory fragment comprises address calculations leading up to a memory access. A compute fragment comprises all other operations in the parent execution fragment. In one implementation, each execution fragment is broken up into a plurality of memory fragments and exactly one compute fragment. In one implementation, the compiler 148 performs the partitioning using reverse dataflow analysis such that inputs to an address used in a memory access are recursively flagged until the compiler 148 reaches either constant values or (bound) loop/pattern iterators. A single execution fragment can produce one or more memory fragments, depending on how many memory accesses exist in the original loop body. In cases where the same memory addressing logic is shared across multiple memory accesses, address calculation may be duplicated to create multiple memory fragments from the same execution fragment.

The memory fragments of the execution fragments are configured to index into data structures. At least one of the memory fragments indexes into a data structure in the logical memory spaces of one of the memory allocations. Each compute and memory fragment preserves information about all loops whose loop bodies directly contain the operations in the corresponding execution fragment. In one implementation, this corresponds to replicating the calculation of the loop iterators of each loop into each compute and memory fragment. This replication allows each fragment to preserve the same iterative behavior as the original program while also allowing distributed calculation of loop iterators.

The compiler 148 assigns the memory fragments to the virtual memory units and assigns the compute fragments to the virtual compute units, and these assignments are specified in the execution file 156. Each memory fragment is mapped operation-wise to the virtual memory unit corresponding to the memory being accessed. Each operation is lowered to its corresponding configuration intermediate representation for that virtual memory unit. Each compute fragment is mapped operation-wise to a newly allocated virtual compute unit. Each operation is lowered to its corresponding configuration intermediate representation for that virtual compute unit.

The compiler 148 allocates the virtual memory units to physical memory units of a reconfigurable processor (e.g., pattern memory units (PMUs) of the reconfigurable processor) and allocates the virtual compute units to physical compute units of the reconfigurable processor (e.g., pattern compute units (PCUs) of the reconfigurable processor), and these allocations are specified in the execution file 156. The compiler 148 places the physical memory units and the physical compute units onto positions in an array of physical configurable units (e.g., array of physical configurable units 190, 191, 192, 193, 194, 195, 198) of the reconfigurable processor (e.g., reconfigurable processor 180, 181, 182, 183, 184, 185, 188) and routes data and control networks between the placed positions, and these placements and routes are specified in the execution file 156. In one implementation, this includes allocating physical resources such as counters and registers within each physical memory and compute unit, and these allocations are specified in the execution file 156.

The compiler 148 may translate the applications 102 developed with commonly used open-source packages such as Keras and/or PyTorch into reconfigurable processor specifications. The compiler 148 generates the configuration files with configuration data for the placed positions and the routed data and control networks. In one implementation, this includes assigning coordinates and communication resources of the physical memory and compute units by placing and routing units onto the array of the processor while maximizing bandwidth and minimizing latency.

Illustratively, the compute environment 100 may include a data processing system 110 that includes the pool of reconfigurable data flow resources 178, a runtime processor 166, and a controller 150.

The controller 150 is connected to the pool of reconfigurable data flow resources 178 (e.g., via interface 157) and configured to generate a hot-plug event in response to detecting a removal of at least one array of physical configurable units (e.g., array of physical configurable units 190, 191, 192, 193, 194, 195, and/or 198) of the arrays of physical configurable units from the pool of reconfigurable data flow resources 178.

As an example, a bus may interconnect the reconfigurable data flow resources 180, 181, 182, 183, 184, 185, 188 in the pool of reconfigurable data flow resources 178 and the controller 150 may detect a physical removal of one or more of the reconfigurable data flow resources 180, 181, 182, 183, 184, 185, 188 from the bus. As another example, the controller 150 may detect that the runtime processor 166 has taken one or more arrays of physical configurable units 190, 191, 192, 193, 194, 195, 198 of one or more of the reconfigurable data flow resources 180, 181, 182, 183, 184, 185, 188 offline (e.g., for maintenance) without physically disconnecting the one or more reconfigurable data flow resources 180, 181, 182, 183, 184, 185, 188.

According to one aspect, the removal of the at least one array of physical configurable units of the arrays of physical configurable units from the pool of reconfigurable data flow resources 178 is reactive to an error event in the at least one array of physical configurable units. For example, a single-event upset (SEU) in a configuration memory of the at least one array of physical configurable units may cause such an error event. Other events that may cause an error event in the at least one array of physical configurable units include a single-event latch-up (SEL), a single-event gate rupture (SEGR), or a single-event burnout (SEB). All these single-event effects belong to a general class of errors caused by radiation effects in electronic devices. Other error events (e.g., mechanical damage, electrical damage, for example caused by electromigration, etc.) in the at least one array of physical configurable units may also be detected by the controller 150, if desired.

The runtime processor 166 receives the execution file 156 from the SDK 142 and uses the execution file 156 for resource allocation, memory mapping, and execution of the configuration files for the applications 102 on the pool of reconfigurable processors 178. The runtime processor 166 may communicate with the SDK 142 over APIs 154 (e.g., Python APIs). If desired, the runtime processor 166 can directly communicate with the deep learning frameworks 114 over APIs 152 (e.g., C/C++ APIs).

Furthermore, the runtime processor 166 is operatively coupled to the pool of reconfigurable data flow resources 178 (e.g., via interface 172) and connected to the controller 150 (e.g., via interface 155). If desired, interface 172 may be a PCIe interface or any other interface that enables the runtime processor 166 to exchange data with the pool of reconfigurable data flow resources 178. Similarly, interface 155 may be any interface that enables the runtime processor 166 to exchange data with the controller 150.

The runtime processor 166 parses the execution file 156, which includes a plurality of configuration files. Configuration files in the plurality of configurations files include configurations of the virtual data flow resources that are required to execute the user applications 102. The runtime processor 166 allocates a subset of the arrays of physical configurable units in the pool of reconfigurable data flow resources 178 to the virtual data flow resources.

The runtime processor 166 then loads the configuration files for the applications 102 to the subset of the arrays of physical configurable units. The runtime processor 166 then starts execution of the user applications 102 on the subset of the arrays of physical configurable units. The runtime processor 166 also includes logic to receive the hot-plug event (e.g., via interface 157) from the controller 150 indicating the removal of the at least one array of physical configurable units from the pool of reconfigurable data flow resources 178. According to one aspect, the at least one array of physical configurable units is unallocated.

The runtime processor 166 is further configured to make the at least one array of physical configurable units unavailable for subsequent allocations of subsequent virtual data flow resources and subsequent executions of subsequent user applications 102, while the subset of the arrays of physical configurable units continues the execution of the user applications 102.

An application for the purposes of this description includes the configuration files for reconfigurable data flow resources in the pool of reconfigurable data flow resources 178 compiled to execute a mission function procedure or set of procedures using the reconfigurable data flow resources, such as inferencing or learning in an artificial intelligence or machine learning system. A virtual machine for the purposes of this description comprises a set of reconfigurable data flow resources (including arrays of physical configurable units in one or more reconfigurable processor and bus and memory channels) configured to support execution of an application in arrays of physical configurable units and associated bus and memory channels in a manner that appears to the application as if there were a physical constraint on the resources available, such as would be experienced in a physical machine. The virtual machine can be established as a part of the application of the mission function that uses the virtual machine, or it can be established using a separate configuration mechanism. In implementations described herein, virtual machines are implemented using resources of the pool of reconfigurable data flow resources 178 that are also used in the application, and so the configuration files for the application include the configuration data for its corresponding virtual machine, and links the application to a particular set of physical configurable units in the arrays of physical configurable units and associated bus and memory channels.

The runtime processor 166 implements a first application in virtual machine VM1 that is allocated a particular set of reconfigurable data flow resources and implements a second application in virtual machine VM2 that is allocated another set of reconfigurable data flow resources. Virtual machine VM1 includes a particular set of physical configurable units, which can include some or all physical configurable units of a single reconfigurable processor or of multiple reconfigurable processors, along with associated bus and memory resources (e.g., PCIe channels, DMA channels, DDR channels, DRAM memory). Virtual machine VM2 includes another set of physical configurable units, which can include some or all physical configurable units of a single reconfigurable processor or of multiple reconfigurable processors, along with associated bus and memory resources (e.g., PCIe channels, DMA channels, DDR channels, DRAM memory).

The runtime processor 166 respects the topology information (e.g., topology information 204 of FIG. 2) in the execution file 156 when allocating physical configurable units to the virtual data flow resources requested in the execution file 156. For example, consider the scenario in which the reconfigurable processor has a non-uniform communication bandwidth in East/West directions versus North/South directions. In this scenario, a virtual tile geometry that requires, for example, two tiles arranged horizontally, may suffer in performance if mapped to a physical tile geometry in which two tiles are arranged vertically. In some implementations, the topology information may specify rectilinear tile geometries.

As discussed above, the configurations of virtual data flow resources in the execution file 156 specify virtual memory segments for the reconfigurable data flow resources in the pool of reconfigurable data flow resources 178, including virtual address spaces of the virtual memory segments and sizes of the virtual address spaces. The runtime processor 166 maps the virtual address spaces of the virtual memory segments to physical address spaces of physical memory segments in the memory. The memory can be host memory, or device memory (e.g., off-chip DRAM).

The runtime processor 166 configures control and status registers of the reconfigurable data flow resources in the pool of reconfigurable data flow resources 178 with configuration data identifying the mapping between the virtual address spaces and the physical address spaces for the configuration files to access the physical memory segments during execution of the applications 102. Accordingly, a first set of the physical memory segments mapped to a first set of the reconfigurable data flow resources in the pool of reconfigurable data flow resources 178 allocated to a first application are different from a second set of the physical memory segments mapped to a second set of the reconfigurable data flow resources in the pool of reconfigurable data flow resources 178 allocated to a second application. Furthermore, access of the first set of the reconfigurable data flow resources is confined to the first set of the physical memory segments, and access of the second set of the reconfigurable data flow resources is confined to the second set of the physical memory segments.

Figure 2:
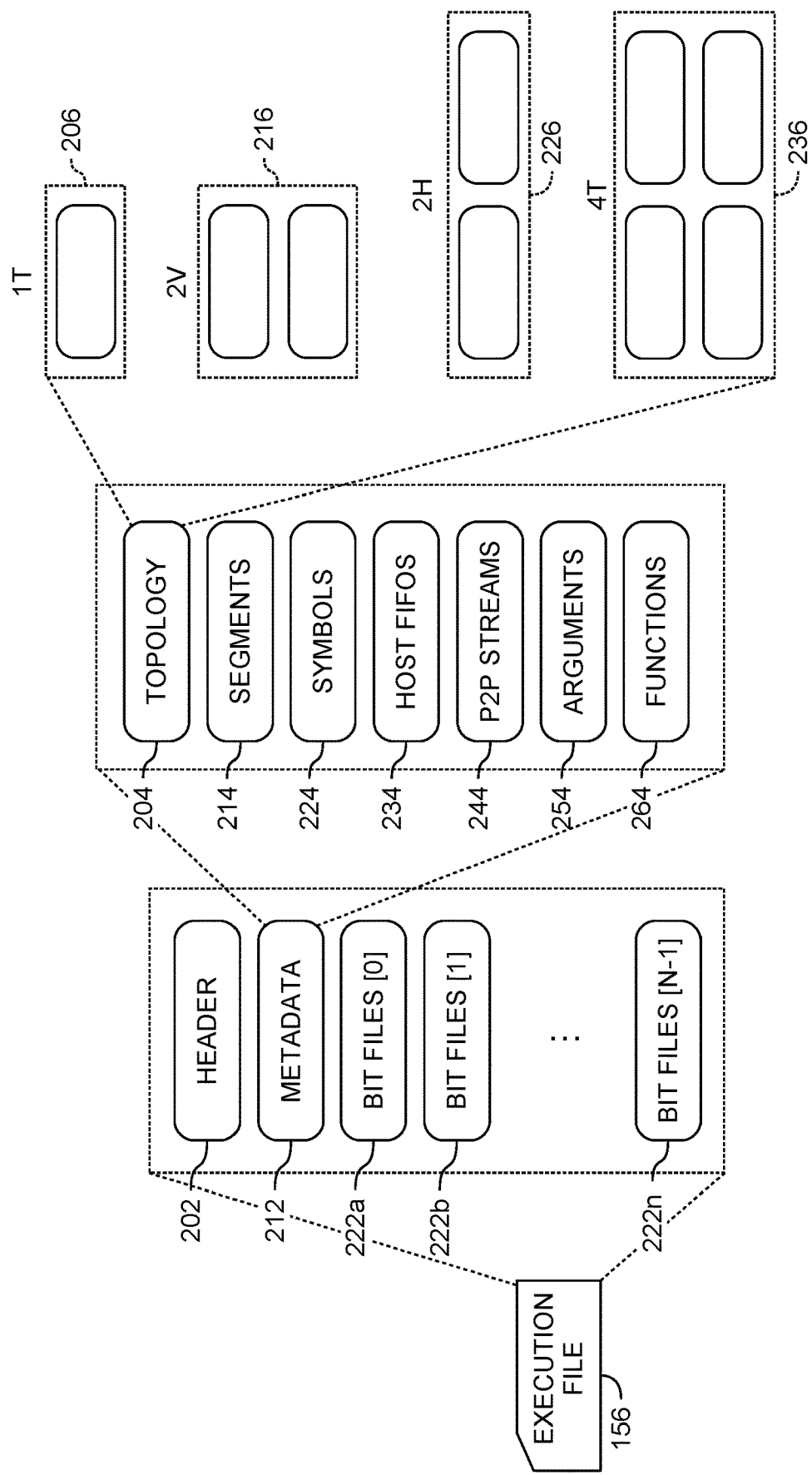
FIG. 2 is a diagram of an illustrative implementation of an execution file used by the technology disclosed to execute the applications on arrays of physical configurable units in reconfigurable processors in the pool of reconfigurable data flow resources.

Turning to FIG. 2, as described above, the execution file 156 includes configuration files (e.g., configuration files 222a, 222b, . . . 222n). The configuration files are sometimes also referred to as bit files 222a, 222b, . . . 222n that implement the computation graphs 136 of the user applications 102 using the arrays of configurable units 190, 191, 192, 193, 194, 195, 198 in the reconfigurable processors 180, 181, 182, 183, 184, 185, 188 of FIG. 1.

A program executable contains a bit-stream representing the initial configuration, or starting state, of each of the physical configurable units that execute the program. This bit-stream is referred to as a bit file, or hereinafter as a configuration file. The execution file 156 includes header 202 that indicates destinations on the reconfigurable processors for configuration data in the configuration files. In some implementations, a plurality of configuration files is generated for a single application.

The execution file 156 includes metadata 212 that accompanies the configuration files and specifies configurations of virtual data flow resources required to execute the applications 102. In one example, the execution file 156 can specify that a particular application needs an entire reconfigurable processor for execution, and as a result the metadata 212 identifies virtual data flow resources equaling at least the entire reconfigurable processor for loading and executing the configuration files for the particular application. In another example, the execution file 156 can specify that a particular application needs one or more portions of a reconfigurable processor for execution, and as a result the metadata 212 identifies virtual data flow resources equaling at least the one or more portions of the reconfigurable processor for loading and executing the configuration files for the particular application. In yet another example, the execution file 156 can specify that a particular application needs two or more reconfigurable processors for execution, and as a result the metadata 212 identifies virtual data flow resources equaling at least the two or more reconfigurable processors for loading and executing the configuration files for the particular application. In yet another example, the execution file 156 can specify that a particular application needs an entire first reconfigurable processor and one or more portions of a second reconfigurable processor for execution, and as a result the metadata 212 identifies virtual data flow resources equaling at least the first reconfigurable processor and the one or more portions of the second reconfigurable processor for loading and executing the configuration files for the particular application.

In yet another example, the execution file 156 can specify that a particular application needs an entire node for execution, and as a result the metadata 212 identifies virtual data flow resources equaling at least the entire node for loading and executing the configuration files for the particular application. In yet another example, the execution file 156 can specify that a particular application needs two or more nodes for execution, and as a result the metadata 212 identifies virtual data flow resources equaling at least the two or more nodes for loading and executing the configuration files for the particular application. In yet another example, the execution file 156 can specify that a particular application needs an entire first node and one or more reconfigurable processors of a second node for execution, and as a result the metadata 212 identifies virtual data flow resources equaling at least the entire first node and the one or more reconfigurable processors of the second node for loading and executing the configuration files for the particular application.

One skilled in the art would appreciate that the execution file 156 can similarly specify reconfigurable processors or portions thereof spanning across racks, pods, superpods, and zones in a data center, and as a result the metadata 212 identifies virtual data flow resources spanning across the racks, pods, superpods, and zones in the data center for loading and executing the configuration files for the particular application.

As part of the metadata 212, the execution file 156 includes topology information 204 that specifies orientation or shapes of portions of a reconfigurable processor required to load and execute the configuration files for a particular application. A reconfigurable processor may include one or more arrays of physical configurable units (e.g., reconfigurable processor 180 of FIG. 1 may include arrays of physical configurable units 190) in a programmable interconnect fabric. If desired, an array of physical configurable units may include compute units and/or memory units. The arrays of physical configurable units in the pool of reconfigurable data flow resources (e.g., pool of reconfigurable data flow resources 178 of FIG. 1) may be partitionable into two or more subsets of arrays of physical configurable units. A subset is a set (or grid) of arrays of physical configurable units and covers at least a portion of the arrays of physical configurable units in the pool of reconfigurable data flow resources. Illustratively, a reconfigurable data flow resource may include a plurality of tiles, whereby a tile is a portion of the arrays of physical configurable units with a certain number of physical configurable units.

In one implementation, a reconfigurable processor comprises a plurality of tiles of configurable units, for example, four tiles that form an array of configurable units in the reconfigurable processor. The topology information 204 specifies an orientation of tiles in the plurality of tiles required to load and execute the configuration files for a particular application.

For example, when the particular application is allocated two tiles of the reconfigurable processor, the topology information 204 specifies whether the two tiles are arranged in a vertical orientation (2V) 216 or a horizontal orientation (2H) 226. The topology information 204 can also allocate a single tile (1T) 206 of the reconfigurable processor to the particular application. The topology information 204 can also allocate all four tiles (4T) 236 of the reconfigurable processor to the particular application. In other implementations, other geometries may be specified, such as a group of three tiles.

The execution file 156 also specifies virtual flow resources like PCIe channels, DMA channels, and DDR channels required to load and execute the configuration files for a particular application. The execution file 156 also specifies virtual flow resources like main memory (e.g., off-chip/external DRAM), local secondary storage (e.g., local disks (e.g., HDD, SSD)), remote secondary storage (e.g., distributed file systems, web servers), latches, registers, and caches (e.g., SRAM) required to load and execute the configuration files for a particular application.

The execution file 156 also specifies virtual memory segments 214 for the requested virtual flow resources, including virtual address spaces of the virtual memory segments and sizes of the virtual address spaces. The execution file 156 also specifies symbols 224 (e.g., tensors, streams) required to load and execute the configuration files for a particular application. The execution file 156 also specifies HOST FIFOs 234 accessed by the configuration files for a particular application during execution. The execution file 156 also specifies peer-to-peer (P2P) streams 244 (e.g., data flow exchanges and control token exchanges between sources and sinks) exchanged between configurable units on which the configuration files for a particular application are loaded and executed. The execution file 156 also specifies arguments 254 that modify execution logic of a particular application by supplying additional parameters or new parameter values to the configuration files for the particular application. The execution file 156 also specifies functions 264 (e.g., data access functions like transpose, alignment, padding) to be performed by the configurable units on which the configuration files for a particular application are loaded and executed.

Figure 3A:
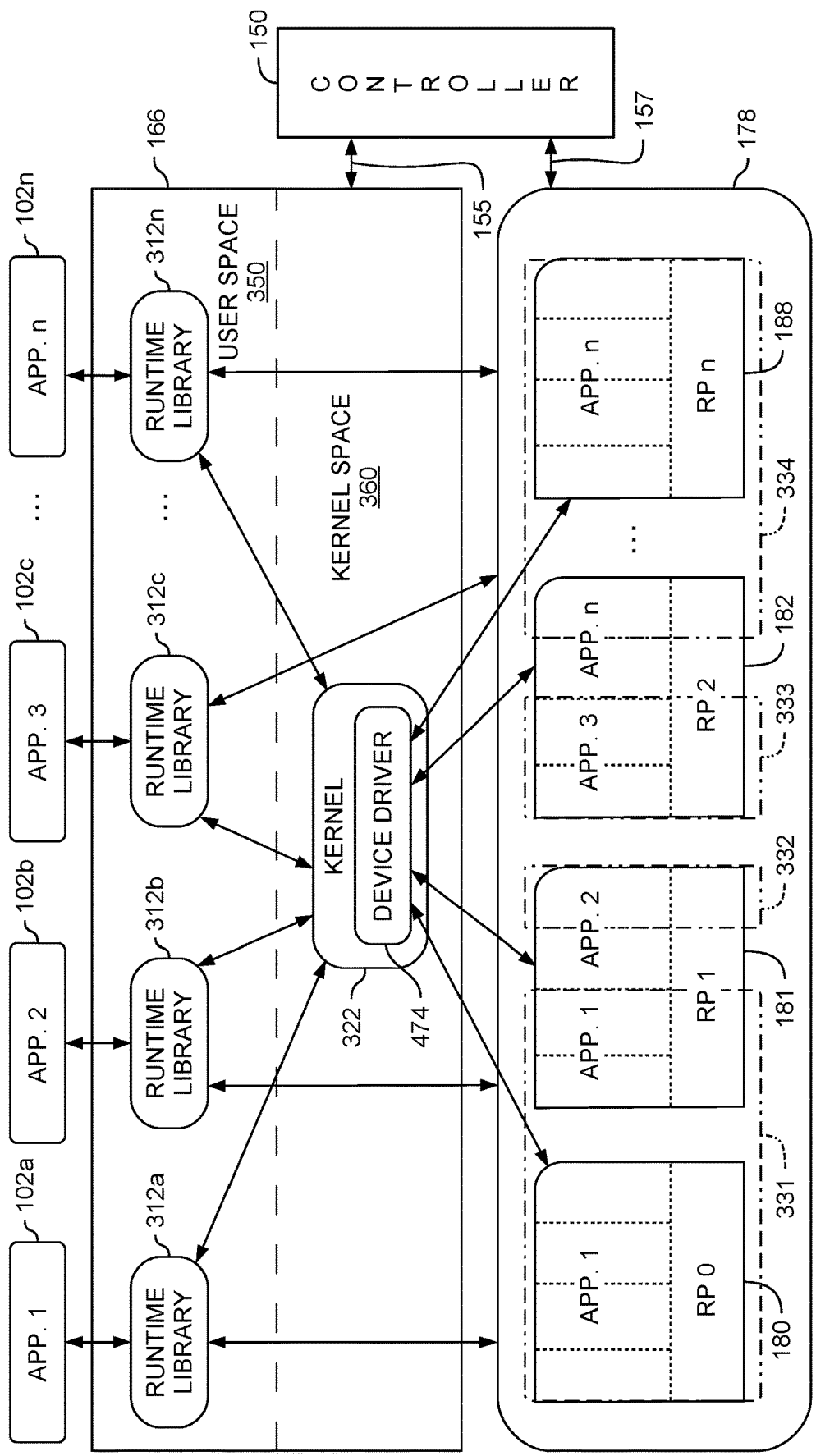
FIG. 3A is a diagram of an illustrative implementation of concurrently executing applications on different arrays of physical configurable units in the reconfigurable processors in the pool of reconfigurable data flow resources in accordance with the disclosed technology.

FIG. 3A illustrates one implementation of concurrently executing user applications (e.g., user applications 102 of FIG. 1) on different subsets of the arrays of physical configurable units in the reconfigurable processors in the pool of reconfigurable data flow resources 178.

Illustratively, the runtime processor 166 includes a runtime library that runs in a user space 350 and a kernel module 322, which is sometimes also referred to as a kernel 322, that runs in a kernel space 360 of a host processor. The host processor may have host memory. In implementations disclosed herein, the runtime processor 166, based on virtual data flow resources requested in the execution file (e.g., execution file 156 of FIG. 1 or FIG. 2) for configuration files of a particular application, allocates segments of the host memory to a virtual machine that implements the particular application. If desired, the runtime processor 166 runs on top of Linux.

The runtime processor 166 partitions the physical hardware resources, i.e. arrays of physical configurable units in the reconfigurable processors, into multiple virtual resources, and provides uniform and coherent access to these virtual resources as being physical in a balanced and unified view. It also manages all interactions among the user applications and their required resources by handling the traffic of application requests for reconfigurable resources, memory, and I/O channels.

The example illustrated in FIG. 3A shows a plurality of applications 102a, 102b, 102c, . . . , 102n, which are concurrently executed by different instances 312a, 312b, 312c, . . . , 312n of the runtime library using the pool of reconfigurable data flow resources 178.

Based on the topologies specified in the execution file, the runtime library allocates one or more of the arrays of physical configurable units of a single reconfigurable processor to two or more configuration files of two or more application graphs. The device driver 474 concurrently loads and executes the two or more configuration files on the arrays of physical configurable units of the single reconfigurable processor. This is illustrated in FIG. 3A by the configuration files for applications 1 and 2 331, 332 running on reconfigurable processor 1 (RP 1) 181 and the configuration files for applications 3 and n 333, 334 running on reconfigurable processor 2 (RP 2) 182.

Based on the topologies specified in the execution file, the runtime library allocates arrays of physical configurable units of two or more reconfigurable processors to a single configuration file of a single application graph based on the topologies. The device driver 474 concurrently loads and executes the single configuration file on the arrays of physical configurable units of the two or more reconfigurable processors. This is illustrated in FIG. 3A by the configuration files for application 1 331 running on reconfigurable processor 0 (RP 0) 180 and reconfigurable processor 1 (RP 1) 181, and the configuration files for application n 334 running on reconfigurable processor 2 (RP 2) 182 and reconfigurable processor n (RP n) 188.

Illustratively, the reconfigurable processors 0, 1, 2, n 180, 181, 182, 188 may form a plurality of integrated circuits. The reconfigurable processors 0, 1, 2, and n can be implemented on a single integrated circuit die or on a multichip module. An integrated circuit can be packaged in a single chip module or a multi-chip module (MCM). An MCM is an electronic package consisting of multiple integrated circuit die assembled into a single package, configured as a single device. The various die of an MCM are mounted on a substrate, and the bare die of the substrate are connected to the surface or to each other using for some examples, wire bonding, tape bonding or flip-chip bonding.

The runtime processor 166 (i.e., the runtime library) is configured to receive a configuration file for a user application. The configuration file specifies virtual resources required to execute the user application. The virtual resources span two or more of the integrated circuits. A single or common device driver 474 is operatively coupled to the plurality of integrated circuits (i.e., reconfigurable processors 0, 1, 2, and n). The device driver 474 includes logic to allocate, to the virtual resources in the configuration file, physical configurable units and memory across the two or more of the integrated circuits, and load the configuration file to the allocated physical configurable units, and execute the user application using the allocated physical configurable units and memory.

The controller 150 is connected to the pool of reconfigurable data flow resources 178 via interface 157 and to the runtime processor 166 via interface 155. In response to detecting a removal of at least one array of physical configurable units of the arrays of physical configurable units from the pool of reconfigurable data flow resources 178, the controller 150 is configured to generate a hot-plug event and send the hot-plug event to the runtime processor 166 via interface 155.

For example, the controller 150 may monitor ports of a bus to which the reconfigurable data flow resources 180, 181, 182, . . . 188 are connected. Upon removal of a reconfigurable data flow resource from such a port, and thereby from the pool of reconfigurable data flow resources 178, the controller 150 may receive a status signal via interface 157 from the port from which the reconfigurable data flow resource was removed.

As an example, consider the scenario in which the controller 150 is configured to generate a hot-plug event in response to detecting a removal of an allocated array of physical configurable units (e.g., the array of physical configurable units in reconfigurable processor 181 that is allocated to user application 332) from the subset of physical configurable units in reconfigurable processors 180, 181, 182, 188. In this scenario, the runtime processor 166 may be configured to receive the hot-plug event from the controller 150 indicating the removal of the allocated array of physical configurable units from the subset of physical configurable units. The runtime processor 166 may further be configured to stop the execution of the user application 332 on the allocated array of physical configurable units, and make the allocated array of physical configurable units unavailable for the subsequent allocation of the subsequent virtual data flow resources and the subsequent execution of the subsequent user applications, while other allocated arrays of physical configurable units in the subset of physical configurable units continue the execution of the user applications 331, 333, 334.

The hot-plug event may be transmitted to a module in the runtime processor 166 as an interrupt. The module in the runtime processor 166 may be configured to respond to the interrupt by transmitting a file descriptor data structure using an input-output control (IOCTL) system call. The file descriptor data structure may specify that the allocated array of physical configurable units in the reconfigurable processor 181 is unavailable for the subsequent allocation of the subsequent virtual data flow resources and the subsequent execution of the subsequent user applications.

The controller 150 may be configured to generate an additional hot-plug event in response to detecting a removal of an allocated array of physical configurable units that implements an allocated virtual function. Illustratively, the runtime processor 166 is further configured to receive the additional hot-plug event from the controller 150 indicating the removal of the allocated array of physical configurable units that implements the allocated virtual function, and stop the execution of one or more of the user applications on the allocated virtual function.

The runtime processor 166 may further be configured to make the allocated virtual function unavailable for the subsequent allocation of the subsequent virtual data flow resources and the subsequent execution of the subsequent user applications, while other allocated arrays of physical configurable units in the subset of physical configurable units continue the execution of the user applications.

By way of example, the additional hot-plug event may be transmitted to a module in the runtime processor 166 as an interrupt. The module in the runtime processor 166 may be configured to respond to the interrupt by transmitting a file descriptor data structure using an input-output control (IOCTL) system call. The file descriptor data structure may specify that the allocated virtual function is unavailable for the subsequent allocation of the subsequent virtual data flow resources and the subsequent execution of the subsequent user applications.

As another example, consider the scenario in which the controller 150 is configured to generate a hot-plug event in response to detecting an addition of a virtual function on an initialized array of physical configurable units (e.g., one of the arrays of physical configurable units in reconfigurable processor 188) in the pool of reconfigurable data flow resources 178. In this scenario, the runtime processor 166 is configured to receive the hot-plug event from the controller 150 indicating the addition of the virtual function on the initialized array of physical configurable units in the pool of reconfigurable data flow resources. The runtime processor 166 may further be configured to make the virtual function available for the subsequent allocation of the subsequent virtual data flow resources and the subsequent execution of the subsequent user applications, while the subset of physical configurable units continues execution of the user applications 331, 332, 333, 334.

If desired, the reconfigurable data flow resources 180, 181, 182, . . . 188 in the pool of reconfigurable data flow resources 178 may be interconnected using an interconnecting device (e.g., a PCIe bus or an InfiniBand networking card), and the virtual function may be initialized using a single-root input-output virtualization (SR-IOV) interface.

According to one aspect, the controller 150 transmits the hot-plug event via interface 155 to a module in the runtime processor 166 as an interrupt. The module may be configured to respond to the interrupt by executing an initialization of the virtual function and transmitting a file descriptor data structure using an input-output control (IOCTL) system call. The file descriptor data structure may specify the initialization of the virtual function.

Figure 3B:
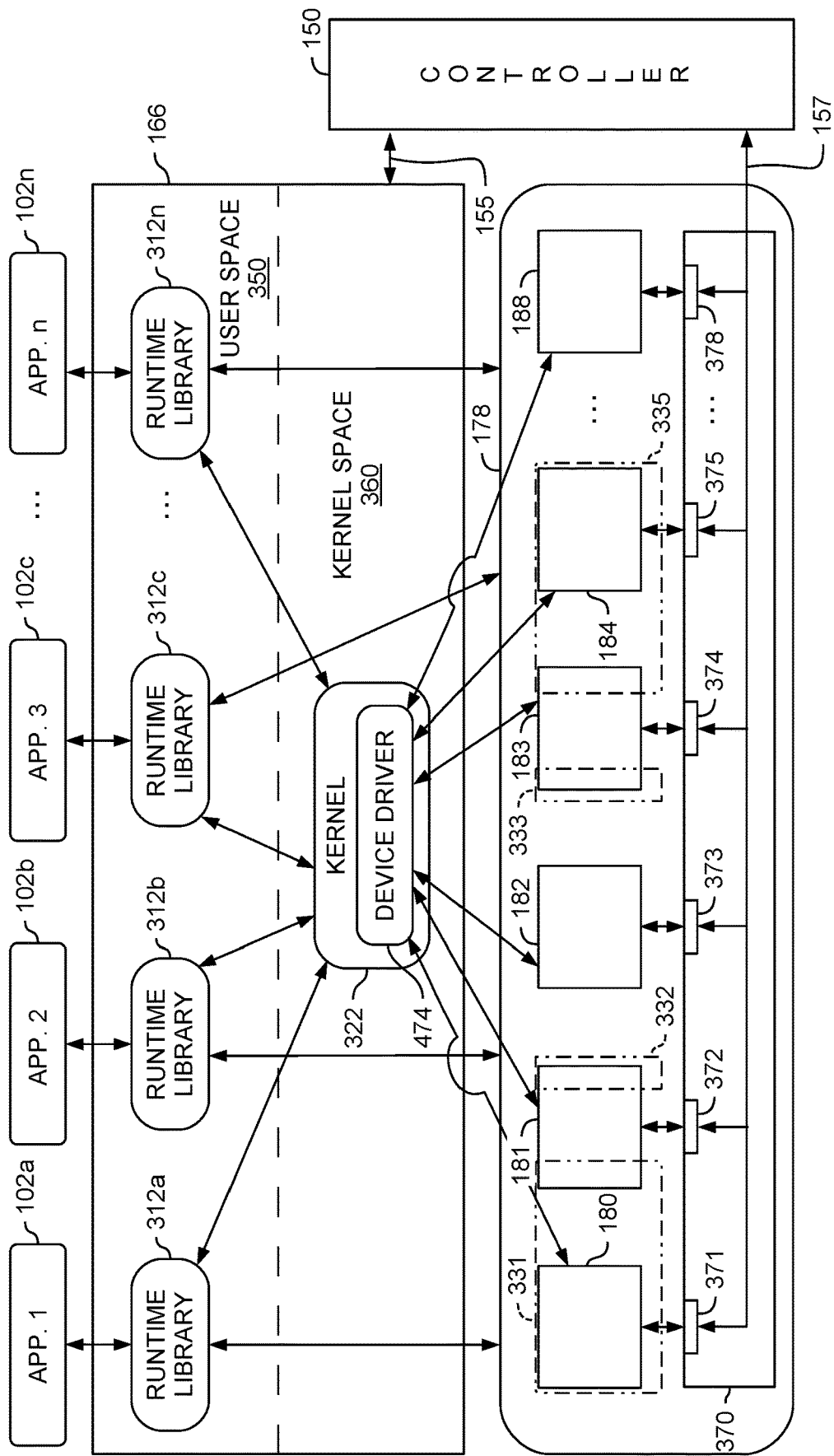
FIG. 3B is a diagram of an illustrative implementation of concurrently executing applications on different arrays of physical configurable units in the reconfigurable processors in the pool of reconfigurable data flow resources, whereby the reconfigurable processors are connected to ports of a bus that are monitored by a master controller in accordance with the disclosed technology.

FIG. 3B illustrates concurrently executing user applications 102a, 102b, 102c, 102n on different arrays of physical configurable units 331, 332, 333, 335 in the reconfigurable processors in the pool of reconfigurable data flow resources 178. For example, arrays of physical configurable units 331 in reconfigurable data flow resources 180, 181 may execute user application 102a, arrays of physical configurable units 332 in reconfigurable data flow resources 181 may execute user application 102b, arrays of physical configurable units 333 in reconfigurable data flow resources 183 may execute user application 102c, and arrays of physical configurable units 335 in reconfigurable data flow resources 183, 184 may execute user application 102n. Arrays of physical configurable units in reconfigurable data flow resources 182 and 188 are unallocated. Thus, no user application is executing on arrays of physical configurable units of reconfigurable data flow resources 182, 188.

As shown in FIG. 3B, all reconfigurable data flow resources 180, 181, 182, 183, 184, . . . 188 are connected to a bus 370 at ports 371, 372, 373, 374, 375, 378, respectively. Illustratively, bus 370 may be a Universal Serial Bus (USB), a Peripheral Component Interconnect Express (PCIe) bus, an Inter-Integrated Circuit (I2C) bus, or any other suitable bus. Controller 150 may be implemented as a master controller that monitors all the ports 371, 372, 373, 374, 375, 378 via interface 157.

As an example, consider the scenario in which reconfigurable data flow resource 182 is disconnected from port 373 and removed from the pool of reconfigurable data flow resources 178, for example in response to an error event in the arrays of physical configurable units of the reconfigurable data flow resource 182.

As shown in FIG. 3B, no user application is executing on the reconfigurable data flow resource 182, and the corresponding arrays of physical configurable units are unallocated (i.e., not allocated to any virtual data flow resources).

In this scenario, the controller 150 generates a hot-plug event in response to detecting the removal of the arrays of physical configurable units in the reconfigurable data flow resource 182 from the pool of reconfigurable data flow resources 178. The runtime processor 166 receives the hot-plug event from the controller 150 indicating the removal of the arrays of physical configurable units in reconfigurable data flow resource 182, which are unallocated, from the pool of reconfigurable data flow resources 178. The runtime processor 166 further makes the arrays of physical configurable units in reconfigurable data flow resource 182 unavailable for subsequent allocations of subsequent virtual data flow resources and subsequent executions of subsequent user applications, while the arrays of physical configurable units in reconfigurable data flow resources 180, 181, 183, 184 continue the execution 331, 332, 333, 335 of the user applications 102a, 102b, 102c, 102n.

As another example, consider the scenario in which a reconfigurable data flow resource has been added to the pool of reconfigurable data flow resources 178. For example, previously removed reconfigurable data flow resource 182 has been reconnected with port 373 of bus 370.

In this scenario, the controller 150 generates a hot-plug event in response to detecting the addition of the arrays of physical configurable units in the reconfigurable data flow resource 182 to the pool of reconfigurable data flow resources 178. The runtime processor 166 receives the hot-plug event from the controller 150 indicating the addition of the arrays of physical configurable units in the reconfigurable data flow resource 182 which are unallocated, to the pool of reconfigurable data flow resources 178.

The runtime processor 166 may further make the corresponding arrays of physical configurable units available for the subsequent allocations of the subsequent virtual data flow resources and the subsequent executions of the subsequent user applications, while the other arrays of physical configurable units 331, 332, 333, 335 in reconfigurable data flow resources 180, 181, 183, 184 continue execution of the user applications 102a, 102b, 102c, 102n.

Illustratively, the hot-plug event is transmitted to a module in the runtime processor via interface 155 as an interrupt. As an example, the hot-plug event may be received by the kernel module 322, which may transmit the hot-plug event as an interrupt to a daemon module in the user space 350. As another example, the kernel module 322 may receive the hot-plug event and generate an internal interrupt.

If desired, the module (e.g., the daemon module or the kernel module 322) may be configured to respond to the interrupt by executing an initialization of clocks, bus interfaces, and memory resources of the arrays of physical configurable units in the reconfigurable data flow resource 182. For example, the module may transmit a file descriptor data structure using an input-output control (IOCTL) system call, whereby the file descriptor data structure specifies the initialization of the clocks, the bus interfaces, and the memory resources of the arrays of physical configurable units in the reconfigurable data flow resource 182.

Illustratively, the bus interfaces include at least one of a peripheral component interconnect express (PCIe) channel, a direct memory access (DMA) channel, a double data rate (DDR) channel, an InfiniBand channel, or an Ethernet channel. By way of example, the memory resources include at least one of a main memory, a local secondary storage, or a remote secondary storage.

Figure 3C:
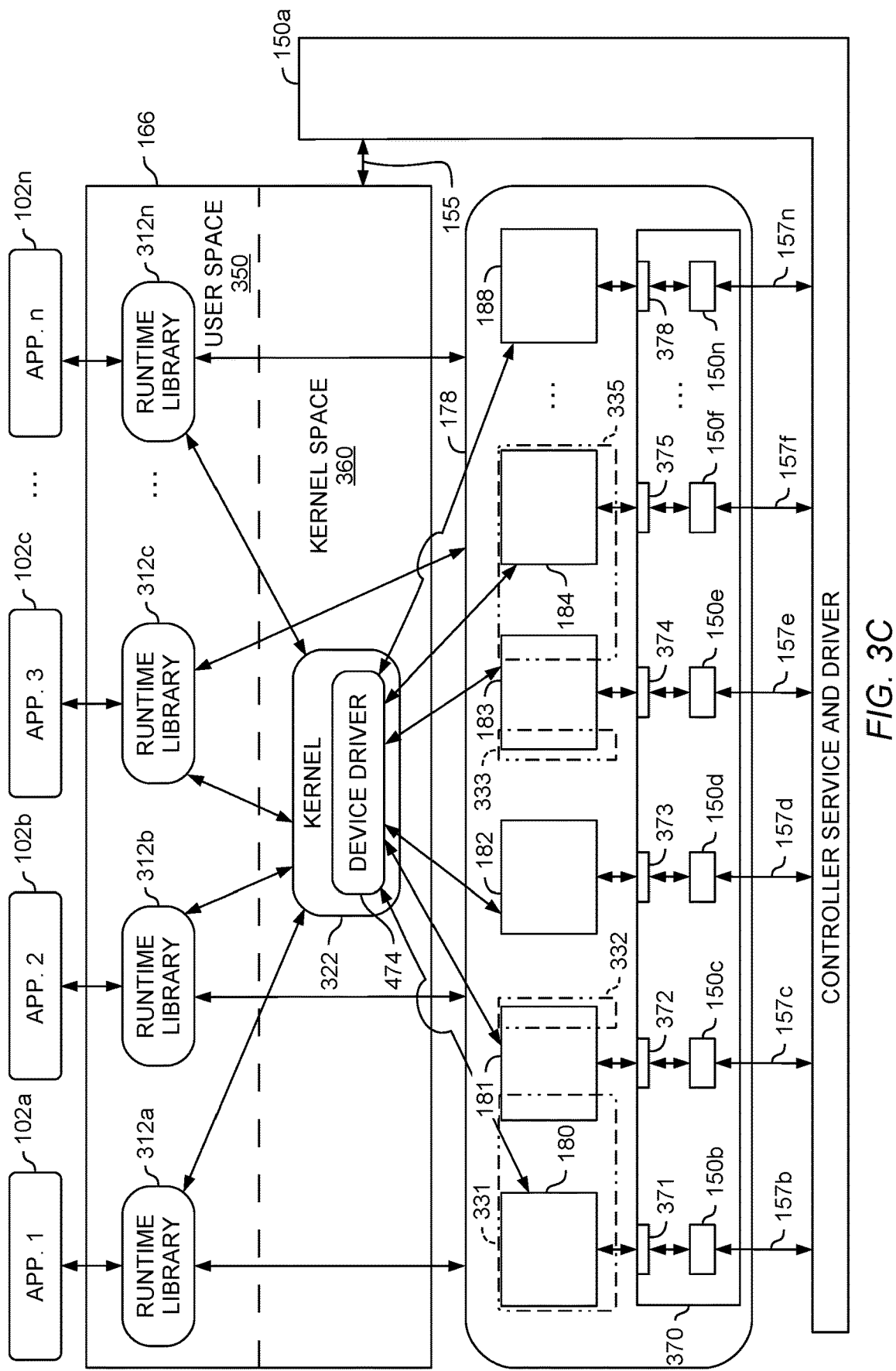
FIG. 3C is a diagram of an illustrative implementation of concurrently executing applications on different arrays of physical configurable units in the reconfigurable processors in the pool of reconfigurable data flow resources, whereby the reconfigurable processors are connected to ports of a bus that are individually monitored by distributed controllers that are connected with a controller service and driver in accordance with the disclosed technology.

FIG. 3C illustrates concurrently executing user applications 102a, 102b, 102c, 102n on different arrays of physical configurable units 331, 332, 333, 335 in the reconfigurable processors in the pool of reconfigurable data flow resources 178. For example, arrays of physical configurable units 331 in reconfigurable data flow resources 180, 181 may execute user application 102a, arrays of physical configurable units 332 in reconfigurable data flow resources 181 may execute user application 102b, arrays of physical configurable units 333 in reconfigurable data flow resources 183 may execute user application 102c, and arrays of physical configurable units 335 in reconfigurable data flow resources 183, 184 may execute user application 102n. Arrays of physical configurable units in reconfigurable data flow resources 182 and 188 are unallocated. Thus, no user application is executing on arrays of physical configurable units of reconfigurable data flow resources 182, 188.

As shown in FIG. 3C, all reconfigurable data flow resources 180, 181, 182, 183, 184, . . . 188 are connected to a bus 370 at ports 371, 372, 373, 374, 375, 378, respectively. Illustratively, bus 370 may be a Universal Serial Bus (USB), a Peripheral Component Interconnect Express (PCIe) bus, an Inter-Integrated Circuit (I2C) bus, or any other suitable bus.

Every port 371, 372, 373, 374, 375, . . . 378 of the bus 370 may be associated with a separate hot-plug controller 150b, 150c, 150d, 150e, 150f, . . . 150n, respectively, that communicate with a controller service and driver 150a via interfaces 157b, 157c, 157d, 157e, 157f, . . . 157n, respectively. Thus, the controller may be implemented using a controller service and driver 150a and distributed hot-plug controllers 150b, 150c, 150d, 150e, 150f, . . . 150n that monitor the respective ports 371, 372, 373, 374, 375, 378.

As an example, consider the scenario in which reconfigurable data flow resource 182 is disconnected from port 373 and removed from the pool of reconfigurable data flow resources 178, for example in response to an error event in the arrays of physical configurable units of the reconfigurable data flow resource 182.

As shown in FIG. 3C, no user application is executing on the reconfigurable data flow resource 182, and the corresponding arrays of physical configurable units are unallocated (i.e., not allocated to any virtual data flow resources).

In this scenario, the hot-plug controller 150d may notify the controller service and driver 150a via interface 157d of the removal of the reconfigurable data flow resource 182 from the pool of reconfigurable data flow resource 178. In response to receiving the notification from the hot-plug controller 150d, the controller service and driver 150a may generate a hot-plug event.

The runtime processor 166 receives the hot-plug event from the controller service and driver 150a indicating the removal of the arrays of physical configurable units in reconfigurable data flow resource 182, which are unallocated, from the pool of reconfigurable data flow resources 178. The runtime processor 166 further makes the arrays of physical configurable units in reconfigurable data flow resource 182 unavailable for subsequent allocations of subsequent virtual data flow resources and subsequent executions of subsequent user applications, while the arrays of physical configurable units in reconfigurable data flow resources 180, 181, 183, 184 continue the execution 331, 332, 333, 335 of the user applications 102a, 102b, 102c, 102n.

As another example, consider the scenario in which a reconfigurable data flow resource has been added to the pool of reconfigurable data flow resources 178. For example, previously removed reconfigurable data flow resource 182 has been reconnected with port 373 of bus 370.

In this scenario, the hot-plug controller 150d notifies the controller service and driver 150a about the addition of the arrays of physical configurable units in the reconfigurable data flow resource 182 to the pool of reconfigurable data flow resources 178, which in turn generates a hot-plug event. The runtime processor 166 receives the hot-plug event from the controller service and driver 150a indicating the addition of the arrays of physical configurable units in the reconfigurable data flow resource 182 which are unallocated, to the pool of reconfigurable data flow resources 178.

The runtime processor 166 may further make the corresponding arrays of physical configurable units available for the subsequent allocations of the subsequent virtual data flow resources and the subsequent executions of the subsequent user applications, while the other arrays of physical configurable units 331, 332, 333, 335 in reconfigurable data flow resources 180, 181, 183, 184 continue execution of the user applications 102a, 102b, 102c, 102n, respectively.

Illustratively, the hot-plug event is transmitted to a module in the runtime processor via interface 155 as an interrupt. As an example, the hot-plug event may be received by the kernel module 322, which may transmit the hot-plug event as an interrupt to a daemon module in the user space 350. As another example, the kernel module 322 may receive the hot-plug event and generate an internal interrupt.

If desired, the module (e.g., the daemon module or the kernel module 322) may be configured to respond to the interrupt by executing an initialization of clocks, bus interfaces, and memory resources of the arrays of physical configurable units in the reconfigurable data flow resource 182. For example, the module may transmit a file descriptor data structure using an input-output control (IOCTL) system call, whereby the file descriptor data structure specifies the initialization of the clocks, the bus interfaces, and the memory resources of the arrays of physical configurable units in the reconfigurable data flow resource 182.

Illustratively, the bus interfaces include at least one of a peripheral component interconnect express (PCIe) channel, a direct memory access (DMA) channel, a double data rate (DDR) channel, an InfiniBand channel, or an Ethernet channel. By way of example, the memory resources include at least one of a main memory, a local secondary storage, or a remote secondary storage.

Figure 4:
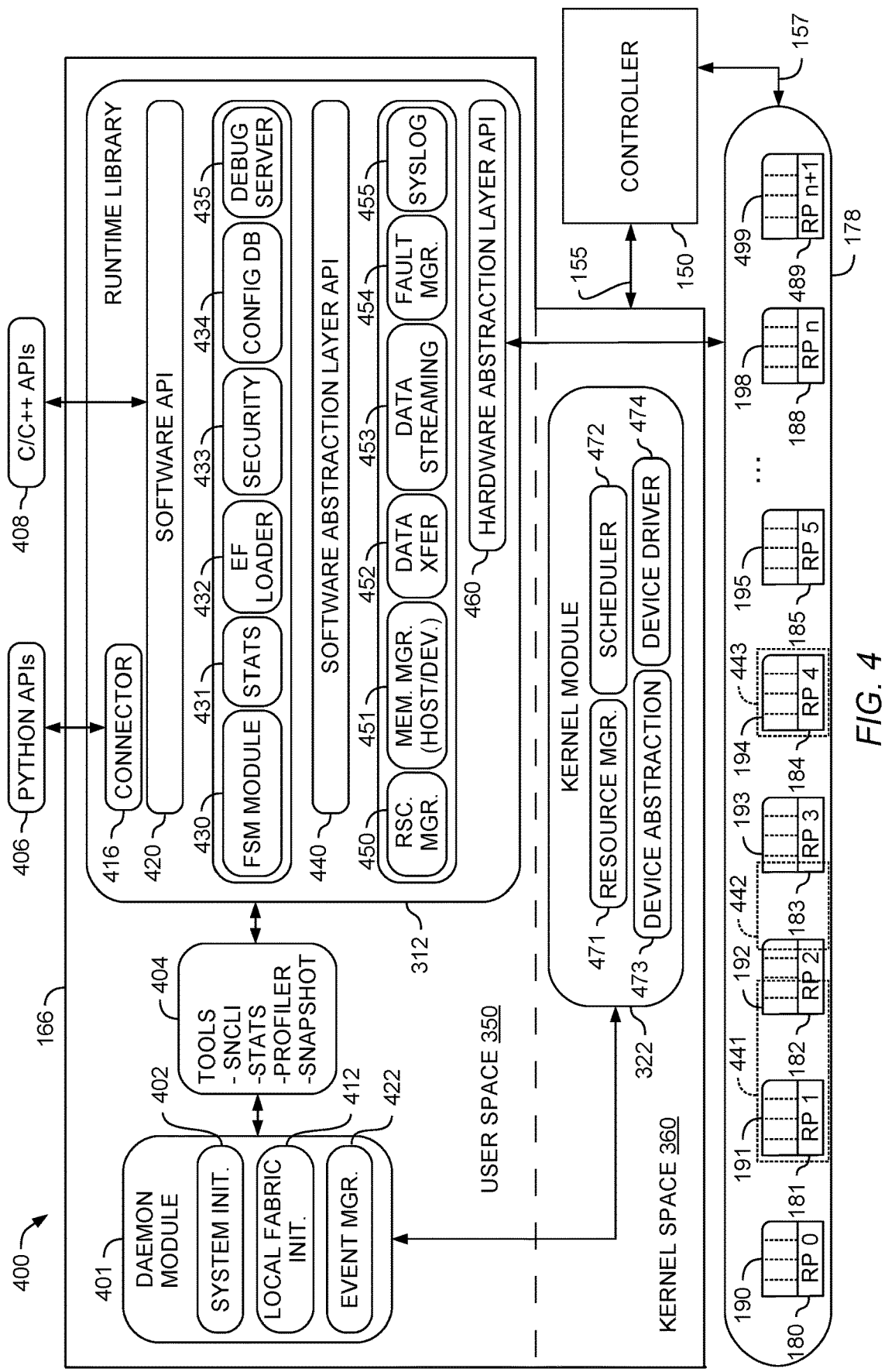
FIG. 4 is a diagram of an illustrative implementation of a software stack implemented by a runtime processor, which enables runtime virtualization of reconfigurable data flow resources in the pool of reconfigurable data flow resources according to the technology disclosed.

FIG. 4 illustrates one implementation of a software stack 400 implemented by the runtime processor 166, which enables runtime virtualization of reconfigurable data flow resources in the pool of reconfigurable data flow resources 178 according to the technology disclosed. The software stack 400 is part of the runtime processor 166 and includes a daemon module 401, tools 404, and the runtime library 312, which operate in the user space 350. The software stack 400 also includes the kernel module 322, which operates in the kernel space 360.

The runtime processor 166 partitions the physical hardware resources, i.e. the reconfigurable processors, into multiple virtual resources, and provides uniform and coherent access to these virtual resources as being physical in a balanced and unified view. The runtime processor 166 also manages all interactions among the user applications (e.g., user applications 102 of FIG. 1) and their required resources by handling the traffic of application requests for reconfigurable resources, memory, and I/O channels.

The daemon module 401 runs as a system service and may include a system initializer 402, a local fabric initializer 412, and an event manager 422. If desired, the daemon module 401 may include a fault management module. Illustratively, the fault management module may be built in conjunction with the event manager 422. The system initializer 402 initializes the reconfigurable processors 180, 181, 182, 183, 184, 185, . . . 188 in the pool of reconfigurable data flow resources 178. The local fabric initializer 412 initializes bus and memory resources, including device DDR and local PCIe fabric. The event manager 422 manages hardware faults and enables debugging of the hardware resources in the pool of reconfigurable data flow resources 178. The tools 404 may include a command line interface (CLI), a statistics provider, a profiler and snapshot for debugging, profile system, and graph applications.

The runtime library 312 includes a connector 416, a software API 420, a software abstraction layer API 440, and a hardware abstraction layer API 460. The connector 416, the software API 420, the software abstraction layer API 440, and the hardware abstraction layer API 460 are a collection of multilingual programming API suites (e.g., Python/C/C++) that the user applications (e.g., machine learning applications) can use to interact with the reconfigurable processors 180, 181, 182, 183, 184, 185, . . . 188 and their associated memory subsystems. The user applications access the software stack 400 via the APIs like Python APIs 406 and/or C/C++ APIs 408.

The runtime library 312 may also include a finite state machine (FSM) module 430, a statistics calculator 431, an execution file loader 432, a security module 433, a configuration database 434, and a debug server 435. The FSM module 430 defines a list of states representing the basic operations that can be grouped together to form an operation flow for a user application. The statistics calculator 431 provides interfaces to read performance counters from the reconfigurable processors 180, 181, 182, 183, 184, 185, . . . 188 in the pool of reconfigurable data flow resources 178. The execution file loader 432 loads and parses the execution file (e.g., execution file 156 of FIG. 1 or FIG. 2) and creates data structures of resources needed to run a user application (e.g., number of tiles/reconfigurable processors, memory segments, arguments, host FIFOs, etc.). The security module 433 maintains isolation between user applications and prevents users/applications from accessing resources not allocated to them. The configuration database 434 includes configuration data required to configure the reconfigurable data flow resources 180, 181, 182, 183, 184, 185, . . . 188 in the pool of reconfigurable data flow resources 178 for executing the user applications. The debug server 435 processes the CLI commands.

The runtime library 312 may also include a resource manager 450, a memory manager 451, a data transfer module 452, a data streaming module 453, a fault manager 454, which is sometimes also referred to as a fault management module 454, and a system log 455. If desired, at least some portions of the fault management module 454 may be part of the daemon module 401. For example, these portions of the fault management module 454 may be built in conjunction with the event manager 422 of the daemon module 401. The resource manager 450 generates requests for the kernel module 322 to manage resources in the pool of reconfigurable data flow resources 178. The memory manager 451 manages the host memory and the device memory (e.g., on-chip and off-chip memory of the reconfigurable processors) and provides efficient allocation/free functions for the user applications and binary data (e.g., bit files, data, arguments, segments, symbols, etc.) in the execution file. The data transfer module 452 handles data transfer requests between the host processor and the reconfigurable processors 180, 181, 182, 183, 184, 185, . . . 188. The data transfer module 452 provides APIs to transfer bit files, arguments, tensors, etc. from the host memory to the reconfigurable processor memory and from the reconfigurable processor memory to the host memory. The transfer is done through hardware supported methods like DMA, mmapped memory, and Remote Direct Memory Access (RDMA). The data streaming module 453 provides GET/SET interfaces to stream data in and out of the reconfigurable processors 180, 181, 182, 183, 184, 185, . . . 188 using host FIFOs. The fault management module 454 identifies the source of hardware interrupts and delivers interrupt events to the daemon module 401 and/or the user applications. The system log 455 logs messages from the daemon module 401 and the applications 102.

The kernel module 322 may include a resource manager 471, a scheduler 472, a device abstraction module 473, and a device driver 474. The resource manager 471 manages the host memory and the device memory (e.g., on-chip and off-chip memory of the reconfigurable processors) and provides efficient allocation/free functions for the user applications and binary data (e.g., bit files, data, arguments, segments, symbols, etc.) in the execution file. The scheduler 472 manages queuing and mapping of the configuration files for the user applications depending on the availability of the hardware resources. The device driver 474 creates device nodes, interfaces with the reconfigurable processors (e.g., by managing low level PCIe input/output operations and DMA buffers), and processes hardware interrupts.

The device abstraction module 473 scans all the reconfigurable processors in the pool of reconfigurable data flow resources 178 and presents them as a single virtual reconfigurable processor device to the user space 350. As an example, all reconfigurable processors in the pool of reconfigurable data flow resources 178 may be presented to the user space as device /dev/rdu.

Thus, the runtime processor 166 is connected to the pool of reconfigurable data flow resources 178 and configured to provide unified access to the plurality of reconfigurable processors via a file system. The runtime processor 166 abstracts out multiple reconfigurable processors 180, 181, 182, 183, 184, 185, . . . 188, including their hardware resources (e.g., arrays and subarrays of physical configurable units, DMA channels, and device memory), into a single virtual reconfigurable processor device for the user applications running in the user space 350.

The kernel module 322 dynamically discovers reconfigurable processors in the pool of reconfigurable data flow resources 178 during module initialization and presents them as a single virtual device /dev/rdu to the user applications running in the user space 350. As a result, each reconfigurable processor acts as a core and each array of configurable units acts a hardware thread, which can be dynamically allocated to a process by the resource manager 471 of the kernel module 322.

Thus, the file system is configured as a rollup file structure representation of the plurality of reconfigurable processors into the root device directory /dev/rdu. Furthermore, the file system is configured to decouple the root device directory /dev/rdu from changes to the pool of reconfigurable data flow resources 178. The changes include a removal of a reconfigurable processor of the plurality of reconfigurable processors 180, 181, 182, 183, 184, 185, . . . 188 from the pool of reconfigurable data flow resources 178. If desired, the changes may include an addition of a previously removed reconfigurable processor or the addition of a new reconfigurable processor (e.g., reconfigurable processor 489) to the pool of reconfigurable data flow resources 178.

In other words, the device abstraction module 473 presents all reconfigurable data flow resources in the pool of reconfigurable data flow resources 178 as device file /dev/rdu to the user space 350. Removing a reconfigurable processor from the pool of reconfigurable data flow resources 178 or adding a reconfigurable processor to the pool of reconfigurable data flow resources 178 is transparent to the user space 350 in that the reconfigurable data flow resources in the pool of reconfigurable data flow resources 178 is always presented as device file /dev/rdu to the user space 350. Please, note that any appropriate device file name may be selected instead, and that /dev/rdu is simply used for illustration purposes.

As shown in FIG. 4, arrays of physical configurable units 191, 192, 193, 194 in reconfigurable processors 181, 182, 183, 184 in the pool of reconfigurable data flow resources 178 may execute user applications 441, 442, 443.

Illustratively, reconfigurable data flow resource 489 with arrays of physical configurable units 499 has been added to the pool of reconfigurable data flow resources 178. The controller 150 may detect the newly added arrays of physical configurable units 499 (e.g., via interface 157 of FIG. 3B) and generate a corresponding hot-plug event. For example, a PCIe bus may connect the reconfigurable data flow resources 180, 181, 182, 183, 184, 185, . . . 188 in the pool of reconfigurable data flow resources 178, and a fast device function (FDF) may scan the PCIe bus and detect the newly added reconfigurable data flow resource 489.

The runtime processor 166 receives the hot-plug event via interface 155 from the controller 150 indicating the addition of the arrays of physical configurable units 499 in the reconfigurable data flow resource 489, which are unallocated, to the pool of reconfigurable data flow resources 178.

For example, the kernel module 322 may receive the hot-plug event via interface 155 from the controller 150, and the device driver 474 in the kernel module 322 may find the appropriate driver for the reconfigurable data flow resource 489. If desired, the kernel module 322 may determine that the newly discovered resource is a physical device (i.e., reconfigurable processor 489) and not a virtual function.

The kernel module 322 may transmit the hot-plug event as an interrupt to the daemon module 401. For example, the runtime processor 166 may include a shared memory space for communication between the kernel space 360 and the user space 350, and the kernel module 322 may send the interrupt to the shared memory space. If desired, the daemon module 401 may check for events in the shared memory, and retrieve the interrupt from the shared memory space.

In response to receiving the interrupt from the kernel module 322, the daemon module 401 may transmit a file descriptor data structure using an input-output control (IOCTL) system call, whereby the file descriptor data structure specifies the initialization of the clocks, the bus interfaces, and the memory resources of the arrays of physical configurable units 499 in the reconfigurable data flow resource 489.

By way of example, the event manager 422 in the daemon module 401 may direct the system initializer 402 to initialize the newly added reconfigurable processor 489 in the pool of reconfigurable data flow resources 178. The event manager 422 may also direct the local fabric initializer 412 to initialize the corresponding clocks, bus interfaces, and memory resources of the arrays of physical configurable units 499 in the reconfigurable data flow resource 489.

Illustratively, the bus interfaces include at least one of a peripheral component interconnect express (PCIe) channel, a direct memory access (DMA) channel, a double data rate (DDR) channel, an InfiniBand channel, or an Ethernet channel. By way of example, the memory resources include at least one of a main memory, a local secondary storage, or a remote secondary storage.

The runtime processor 166 may further make the arrays of physical configurable units 499 available for the subsequent allocations of the subsequent virtual data flow resources and the subsequent executions of the subsequent user applications (e.g., through resource manager 450 and/or resource manager 471), while the other arrays of physical configurable units 191, 192, 193, 194 in reconfigurable data flow resources 181, 182, 183, 184 continue execution of the user applications 441, 442, 443.

As an example, consider the scenario in which a memory resource of a plurality of memory resources of an allocated array of physical configurable units (e.g., arrays of physical configurable units 194 in reconfigurable processor 184) in the pool of reconfigurable data flow resources 178 is in a faulty state.

In this scenario, the fault management module 454 may determine that the memory resource of the plurality of memory resources of the allocated array of physical configurable units 194 in reconfigurable processor 184 is in a faulty state. For example, an error correction code (ECC) may determine that a double data rate (DDR) memory in reconfigurable processor 184 has a correctable or uncorrectable error and communicate the error to the fault management module 454. If desired, the fault management module 454 may be configured to transmit a file descriptor data structure to the kernel module 322 using an input-output control (IOCTL) system call.

The file descriptor data structure may specify that the memory resource of the plurality of memory resources of the allocated array of physical configurable units 194 in the pool of reconfigurable data flow resources 178 is in the faulty state.

Illustratively, the kernel module 322 may be configured to respond to the IOCTL system call by putting the allocated array of physical configurable units 194 in a drain mode. In the drain mode, after the execution of one or more of the user applications on the allocated array of physical configurable units 194, the kernel module 322 removes the allocated array of physical configurable units 194 from the pool of reconfigurable data flow resources 178, thereby transforming the allocated array of physical configurable units 194 into an unavailable array of physical configurable units 194 that is unavailable for the subsequent allocation of the subsequent virtual data flow resources and the subsequent execution of the subsequent user applications.

By way of example the kernel module 322 may be configured to transmit an interrupt to the daemon module 401, for example via a shared memory between the kernel space and the user space. The interrupt may request a reconfiguration of the plurality of memory resources of the unavailable array of physical configurable units 194 without the memory resource that is in the faulty state. The daemon module 401 may be configured to execute the reconfiguration of the plurality of memory resources of the unavailable array of physical configurable units 194 without the memory resource that is in the faulty state. For example, local fabric initializer 412 in daemon module 401 may initialize the memory resources without the memory that is in the faulty state.

If desired, the daemon module 401 may further be configured to transmit a file descriptor data structure to the kernel module 322 using an input-output control (IOCTL) system call. The file descriptor data structure may specify the reconfiguration of the plurality of memory resources of the unavailable array of physical configurable units 194.

The kernel module 322 may be configured to respond to the IOCTL system call by adding the unavailable array of physical configurable units 194 back into the pool of reconfigurable data flow resources 178, thereby transforming the unavailable array of physical configurable units 194 into an available array of physical configurable units 194 that is available for the subsequent allocation of the subsequent virtual data flow resources and the subsequent execution of the subsequent user applications. For example, the resource manager 471 may add the array of physical configurable units 194 back into the pool of reconfigurable data flow resources 178.

As another example, consider the scenario in which a reconfigurable data flow resource 489 has been added to the pool of reconfigurable data flow resources 178, thereby providing newly added arrays of physical configurable units to the pool of reconfigurable data flow resources 178.

In this scenario, the controller 150 generates a hot-plug event in response to detecting the addition of the arrays of physical configurable units 499 in the respective reconfigurable data flow resource 489 to the pool of reconfigurable data flow resources 178. The runtime processor 166 receives the hot-plug event from the controller 150 indicating the addition of the arrays of physical configurable units 499 in the respective reconfigurable data flow resource 489 which are unallocated, to the pool of reconfigurable data flow resources 178. The runtime processor 166 may further make the corresponding arrays of physical configurable units 499 available for the subsequent allocations of the subsequent virtual data flow resources and the subsequent executions of the subsequent user applications, while the other arrays of physical configurable units 331, 332, 333, 335 in reconfigurable data flow resources 180, 181, 183, 184 continue execution of the user applications 102a, 102b, 102c, 102n, respectively.

Illustratively, the hot-plug event is transmitted to a module in the runtime processor via interface 155 as an interrupt. As an example, the hot-plug event may be received by the kernel module 322, which may transmit the hot-plug event as an interrupt to a daemon module in the user space 350. As another example, the kernel module 322 may receive the hot-plug event and generate an internal interrupt.

If desired, the module (e.g., the daemon module or the kernel module 322) may be configured to respond to the interrupt by executing an initialization of clocks, bus interfaces, and memory resources of the arrays of physical configurable units in the respective reconfigurable data flow resource 489. For example, the module may transmit a file descriptor data structure using an input-output control (IOCTL) system call, whereby the file descriptor data structure specifies the initialization of the clocks, the bus interfaces, and the memory resources of the arrays of physical configurable units in the respective reconfigurable data flow resource 489.

Illustratively, the bus interfaces include at least one of a peripheral component interconnect express (PCIe) channel, a direct memory access (DMA) channel, a double data rate (DDR) channel, an InfiniBand channel, or an Ethernet channel. By way of example, the memory resources include at least one of a main memory, a local secondary storage, or a remote secondary storage.

Figure 6:
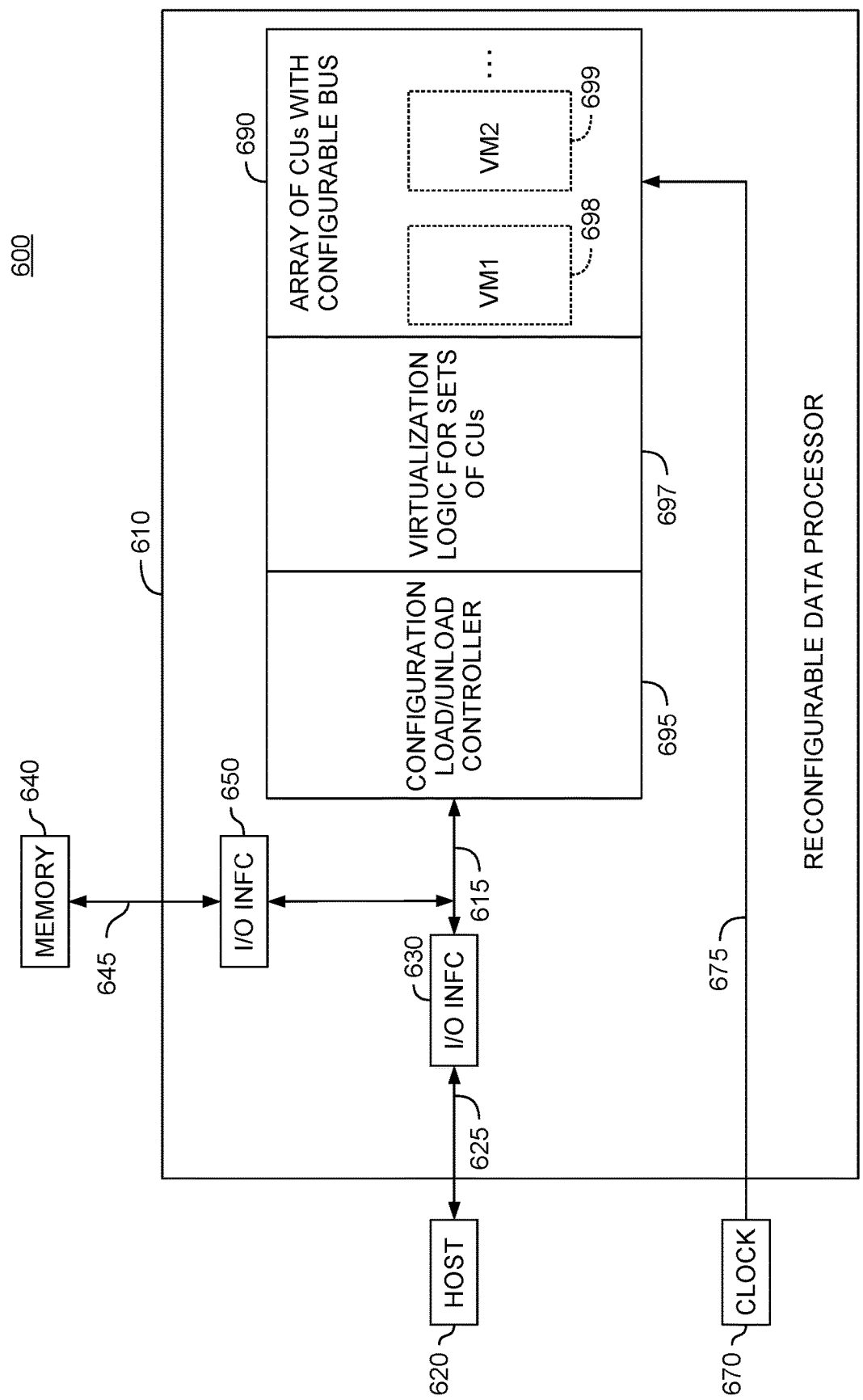
FIG. 6 is a diagram of an illustrative system including a host, a memory, and a reconfigurable data processor according to the technology disclosed.

FIG. 6 is a diagram illustrating a system 600 including a host 620, a memory 640, and a reconfigurable data processor 610 in which a computation unit as described herein is deployed by hardware or by configuration of reconfigurable components and configured with the virtualization logic 697. As shown in the example of FIG. 6, the reconfigurable data processor 610 includes an array 690 of configurable units and a configuration load/unload controller 695.

The virtualization logic 697 can include resources that support or enable simultaneous execution of multiple, unrelated application graphs (or related ones) in an array of configurable units on one die or one multichip module. In the illustration, a first application graph is implemented in virtual machine VM1 in a particular set 697 of configurable units, and a second application graph is implemented in virtual machine VM2 in another set 699 of configurable units. Configurable units can include, or can have units configured to implement, a computation unit or computation units, as described herein.

The processor 610 includes an external I/O interface 630 connected to the host 620 by line 625, and an external I/O interface 650 connected to the memory 640 by line 665. The I/O interfaces 630, 650 connect via a bus system 615 to the array 690 of configurable units and to the configuration load/unload controller 695. The bus system 615 may have a bus width of carrying one chunk of data, which can be for this example 128 bits (references to 128 bits throughout can be considered as an example chunk size more generally).

To configure configurable units in the array 690 of configurable units with a configuration file, the host 620 can send the configuration file to the memory 640 via the interface 630, the bus system 615, and the interface 650 in the reconfigurable data processor 610. The configuration file can be loaded in many ways, as suits a particular architecture, including in data paths outside the configurable processor 610. The configuration file can be retrieved from the memory 640 via the memory interface 650. Chunks of the configuration file can then be sent in a distribution sequence to configurable units in the array 690 of configurable units in the reconfigurable data processor 610.

An external clock generator 670 or other clock line sources can provide a clock line 675 or clock lines to elements in the reconfigurable data processor 610, including the array 690 of configurable units, and the bus system 615, and the external data I/O interfaces. The bus system 615 can communicate data at a processor clock rate via a clock line 675 or clock lines.

Figure 7:
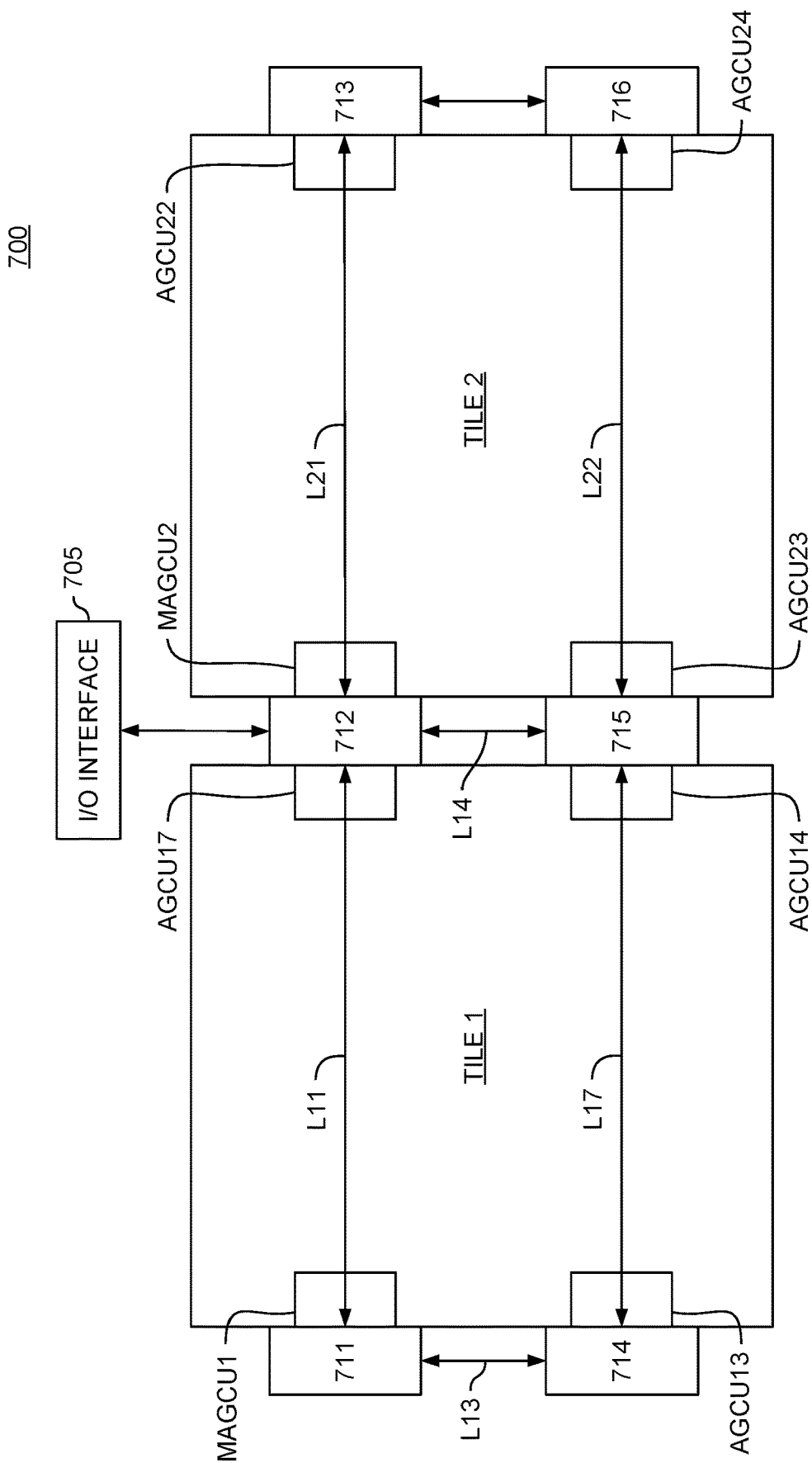
FIG. 7 is a simplified block diagram of an illustrative top-level network and components of a CGRA (Coarse Grain Reconfigurable Architecture).

FIG. 7 is a simplified block diagram of components of a CGRA (coarse-grained reconfigurable architecture) processor. In this example, the CGRA processor has 2 tiles (Tile1, Tile2). The tile comprises an array of configurable units (e.g., arrays of physical configurable units 190, 191, 192, 193, 194, 195, . . . 198 of FIG. 1) connected to a bus system (e.g., bus 370 of FIG. 3B or FIG. 3C), including array level networks in this example. An array of configurable units (e.g., 690, FIG. 6) in the tile includes computation units in hardware or by configuration of reconfigurable components, which are configured with the virtualization logic (e.g., 697 of FIG. 6). The bus system includes a top-level network connecting the tiles to external I/O interface 705 (or any number of interfaces). If desired, different bus system configurations may be utilized. The configurable units in each tile are nodes on the array level network in this embodiment.

Each of the tiles has four Address Generation and Coalescing Units (AGCUs) (e.g., MAGCU1, AGCU17, AGCU13, AGCU14). The AGCUs are nodes on the top-level network and nodes on the array level networks and include resources for routing data among nodes on the top-level network and nodes on the array level network in each tile.

Nodes on the top-level network in this example include one or more external I/Os, including interface 705. The interfaces to external devices include resources for routing data among nodes on the top-level network and external devices, such as high-capacity memory, host processors, other CGRA processors, FPGA devices and so on, that are connected to the interfaces.

One of the AGCUs in a tile is configured in this example to be a master AGCU, which includes an array configuration load/unload controller for the tile. If desired, more than one array configuration load/unload controller can be implemented, and one array configuration load/unload controller may be implemented by logic distributed among more than one AGCU.

The MAGCU1 includes a configuration load/unload controller for Tile1, and MAGCU2 includes a configuration load/unload controller for Tile2. If desired, a configuration load/unload controller can be designed for loading and unloading configuration of more than one tile. In other embodiments, more than one configuration controller can be designed for configuration of a single tile. Also, the configuration load/unload controller can be implemented in other portions of the system, including as a stand-alone node on the top-level network and the array level network or networks.

The top-level network is constructed using top-level switches (711-716) connecting to each other as well as to other nodes on the top-level network, including the AGCUs, and I/O interface 705. The top-level network includes links (e.g., L16, L17, L21, L22) connecting the top-level switches. Data travels in packets between the top-level switches on the links, and from the switches to the nodes on the network connected to the switches. For example, top-level switches 716 and 712 are connected by a link L16, top-level switches 714 and 715 are connected by a link L17, top-level switches 716 and 714 are connected by a link L13, and top-level switches 712 and 713 are connected by a link L21. The links can include one or more buses and supporting control lines, including for example a chunk-wide bus (vector bus). For example, the top-level network can include data, request and response channels operable in coordination for transfer of data in a manner analogous to an AXI compatible protocol. See, AMBA® AXI and ACE Protocol Specification, ARM, 2017.

Top-level switches can be connected to AGCUs. For example, top-level switches 716, 712, 714, and 715 are connected to MAGCU1, AGCU17, AGCU13 and AGCU14 in the tile Tile1, respectively. Top-level switches 712, 713, 715, and 716 are connected to MAGCU2, AGCU22, AGCU23 and AGCU24 in the tile Tile2, respectively.

Top-level switches can be connected to one or more external I/O interfaces (e.g., interface 705).

Figure 8B:
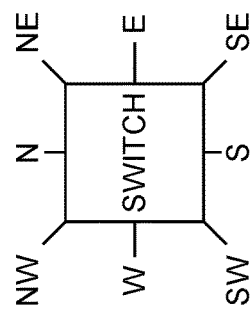
FIG. 8B illustrates an example switch unit connecting elements in an array level network.
Figure 8A:
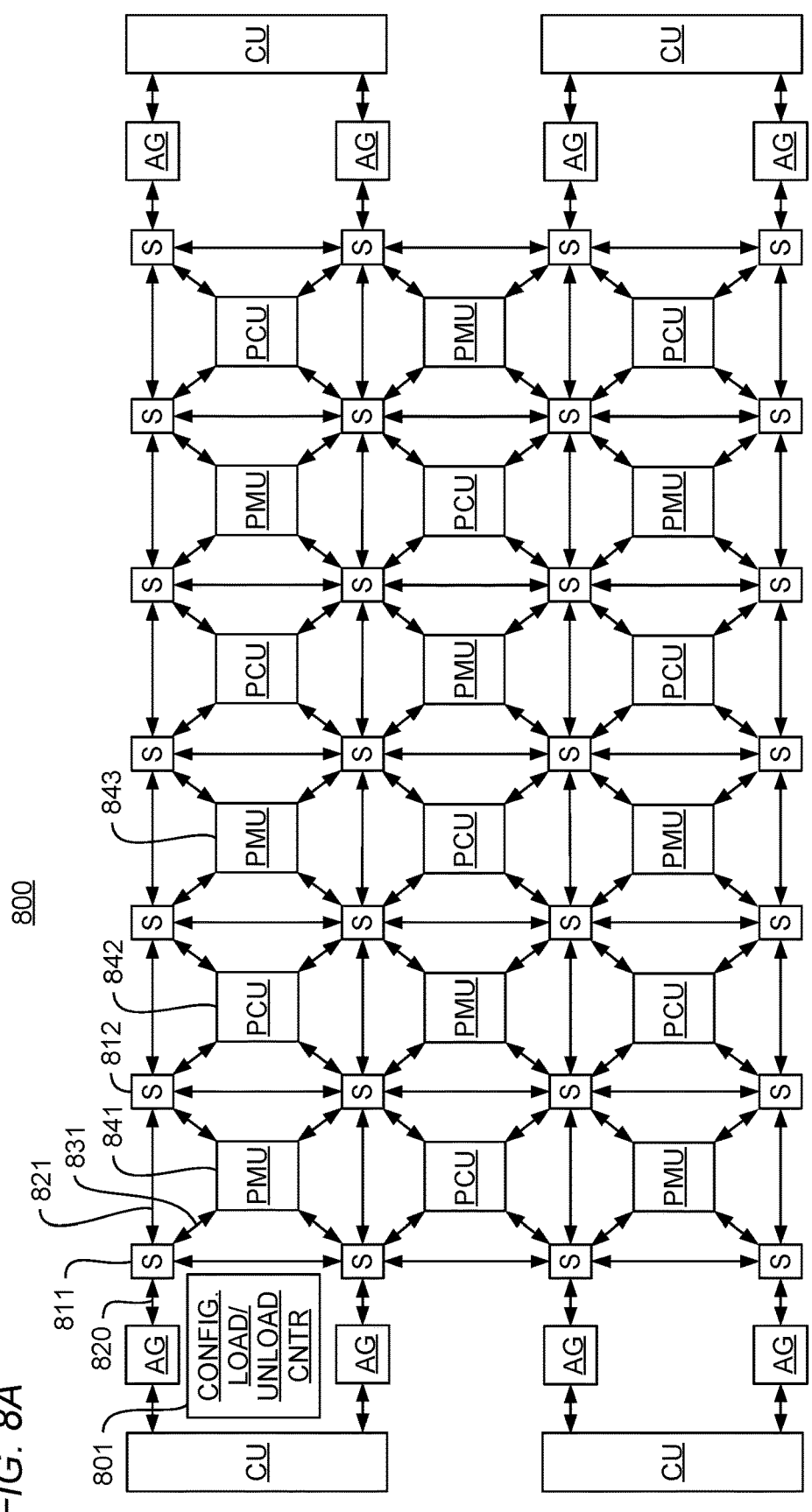
FIG. 8A is a simplified diagram of an illustrative tile and an illustrative array level network.

FIG. 8A is a simplified diagram of a tile and an array level network usable in the configuration of FIG. 7, where the configurable units in the array are nodes on the array level network and are configurable to implement the virtualization logic 697 of FIG. 6.

In this example, the array of configurable units 800 includes a plurality of types of configurable units, which are configured with the virtualization logic 697 of FIG. 6. The types of configurable units in this example, include Pattern Compute Units (PCU), Pattern Memory Units (PMU), switch units (S), and Address Generation and Coalescing Units (each including two address generators (AG) and a shared coalescing unit (CU)). For an example of the functions of these types of configurable units, see, Prabhakar et al., "Plasticine: A Reconfigurable Architecture For Parallel Patterns," ISCA '17, Jun. 24-28, 2017, Toronto, ON, Canada, which is incorporated by reference as if fully set forth herein.

In this example, the PCUs (e.g., 842) and PMUs (e.g., 843) in the array of configurable units 800 can include resources configurable for embodiment of a computation unit, an example configuration of which is described herein (FIGS. 8A and 8B). Each of these configurable units contains a configuration store comprising a set of registers or flip-flops that represent either the setup or the sequence to run a program, and can include the number of nested loops, the limits of each loop iterator, the routes and/or instructions to be executed for each stage including stages, the source of the operands, and the network parameters for the input and output interfaces. The configuration file can include entries of lookup tables as described herein.

Additionally, each of these configurable units contains a configuration store comprising a set of registers or flip-flops that store status usable to track progress in nested loops or otherwise. A configuration file in the configuration store contains a bit-stream representing the initial configuration, or starting state, of each of the components that execute the program. This bit-stream is referred to as a bit file. Program load is the process of setting up the configuration stores in the array of configurable units based on the contents of the bit file to allow the components to execute a program (i.e., a machine), including programs that utilize the virtualization logic 697. Program Load may also require the load of all PMU memories.

The array level network includes links interconnecting configurable units in the array. The links in the array level network include one or more and, in this case, three kinds of physical buses: a chunk-level vector bus (e.g., 128 bits of data), a word-level scalar bus (e.g., 32 bits of data), and a multiple bit-level control bus. For instance, interconnect 821 between switch units 816 and 812 includes a vector bus interconnect with a vector bus width of 128 bits, a scalar bus interconnect with a scalar bus width of 32 bits, and a control bus interconnect.

The three kinds of physical buses differ in the granularity of data being transferred. In one embodiment, the vector bus can carry a chunk that includes 16-Bytes (=128 bits) of data as its payload. The scalar bus can have a 32-bit payload and carry scalar operands or control information. In some machines implemented using this system, data can be represented using floating point data formats, including standard or non-standard formats. Example formats include FP32 and BF16, among others. It can be understood that the number of data values carried on the scalar and vector buses is a function of the encoding format of the data values, with FP32 utilizing 32 bits per value and BF16 using 16 bits per value.

The control bus can carry control handshakes such as tokens and other lines. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit. The control network can be circuit switched based on timing circuits in the device, for example. The configuration load/unload controller can generate a header for each chunk of configuration data of 128 bits. The header is transmitted on a header bus to each configurable unit in the array of configurable unit.

In one example, a chunk of data of 128 bits is transmitted on the vector bus that provides the chunk as vector inputs to a configurable unit. The vector bus can include 128 payload lines, and a set of header lines. The header can include a sequence ID for each chunk, which can include:

A bit to indicate if the chunk is scratchpad memory or configuration store data.
Bits that form a chunk number.
Bits that indicate a column identifier.
Bits that indicate a row identifier.
Bits that indicate a component identifier.

For a load operation, the configuration load controller can send the number N of chunks to a configurable unit in order from N−1 to 0. For this example, the 6 chunks are sent out in most-significant-bit-first order of Chunk 5→Chunk 4→Chunk 3→Chunk 2→Chunk 1→Chunk 0. (Note that this most-significant-bit-first order results in Chunk 5 being distributed in round 0 of the distribution sequence from the array configuration load controller.) For an unload operation, the configuration unload controller can write the unload data out of order to the memory. For both load and unload operations, the shifting in the configuration serial chains in a configuration data store in a configurable unit is from LSB (least-significant-bit) to MSB (most-significant-bit), or MSB out first.

FIG. 8B illustrates an example switch unit connecting elements in an array level network. As shown in the example of FIG. 8B, a switch unit can have 8 interfaces. The North, South, East and West interfaces of a switch unit are used for connections between switch units. The Northeast, Southeast, Northwest and Southwest interfaces of a switch unit are each used to make connections to PCU or PMU instances. A set of 2 switch units in each tile quadrant have connections to an Address Generation and Coalescing Unit (AGCU) that include multiple address generation (AG) units and a coalescing unit (CU) connected to the multiple address generation units. The coalescing unit (CU) arbitrates between the AGs and processes memory requests. Each of the 8 interfaces of a switch unit can include a vector interface, a scalar interface, and a control interface to communicate with the vector network, the scalar network, and the control network.

During execution of a machine after configuration, data can be sent via one or more unit switches and one or more links between the unit switches to the configurable units using the vector bus and vector interface(s) of the one or more switch units on the array level network.

In embodiments described herein, a configuration file or bit file, before configuration of the tile, can be sent from the configuration load controller using the same vector bus, via one or more unit switches and one or more links between the unit switches to the configurable unit using the vector bus and vector interface(s) of the one or more switch units on the array level network. For instance, a chunk of configuration data in a unit file particular to a configurable unit PMU 841 can be sent from the configuration load/unload controller 801 to the PMU 841, via a link 820 between the configuration load/unload controller 801 and the West (W) vector interface of the switch unit 816, the switch unit 816, and a link 831 between the Southeast (SE) vector interface of the switch unit 816 and the PMU 841.

In this example, one of the AGCUs is configured to be a master AGCU, which includes a configuration load/unload controller (e.g., 801). The master AGCU implements a register through which the host (620, FIG. 6) can send commands via the bus system to the master AGCU. The master AGCU controls operations on an array of configurable units in a tile and implements a program control state machine to track the state of the tile based on the commands it receives from the host through writes to the register. For every state transition, the master AGCU issues commands to all components on the tile over a daisy-chained command bus. The commands include a program reset command to reset configurable units in an array of configurable units in a tile, and a program load command to load a configuration file to the configurable units.

The configuration load controller in the master AGCU is responsible for reading the configuration file from the memory and sending the configuration data to every configurable unit of the tile. The master AGCU can read the configuration file from the memory at preferably the maximum throughput of the top-level network. The data read from memory are transmitted by the master AGCU over the vector interface on the array level network to the corresponding configurable unit according to a distribution sequence described herein.

In one embodiment, in a way that can reduce the wiring requirements within a configurable unit, configuration and status registers holding unit files to be loaded in a configuration load process, or unloaded in a configuration unload process, in a component are connected in a serial chain and can be loaded through a process of shifting bits through the serial chain. In some embodiments, there may be more than one serial chain arranged in parallel or in series. When a configurable unit receives the for example 128 bits of configuration data from the master AGCU in one bus cycle, the configurable unit shifts this data through its serial chain at the rate of 1 bit per cycle, where shifter cycles can run at the same rate as the bus cycle. It will take 128 shifter cycles for a configurable unit to load 128 configuration bits with the 128 bits of data received over the vector interface. The 128 bits of configuration data are referred to as a chunk. A configurable unit can require multiple chunks of data to load all its configuration bits.

The configurable units interface with the memory through multiple memory interfaces (650, FIG. 6). Each of the memory interfaces can be accessed using several AGCUs. Each AGCU contains a reconfigurable scalar data path to generate requests for the off-chip memory. Each AGCU contains FIFOs (first-in-first-out buffers for organizing data) to buffer outgoing commands, data, and incoming responses from the off-chip memory.

The above-described configuration is one simplified example of a configuration of a configurable processor for implementing a computation unit as described herein. The configurable processor can be configured in other ways to implement a computation unit. Other types of configurable processors can implement the computation unit in other ways. Also, the computation unit can be implemented using dedicated logic in some examples, or a combination of dedicated logic and instruction-controlled processors.

Figure 9:
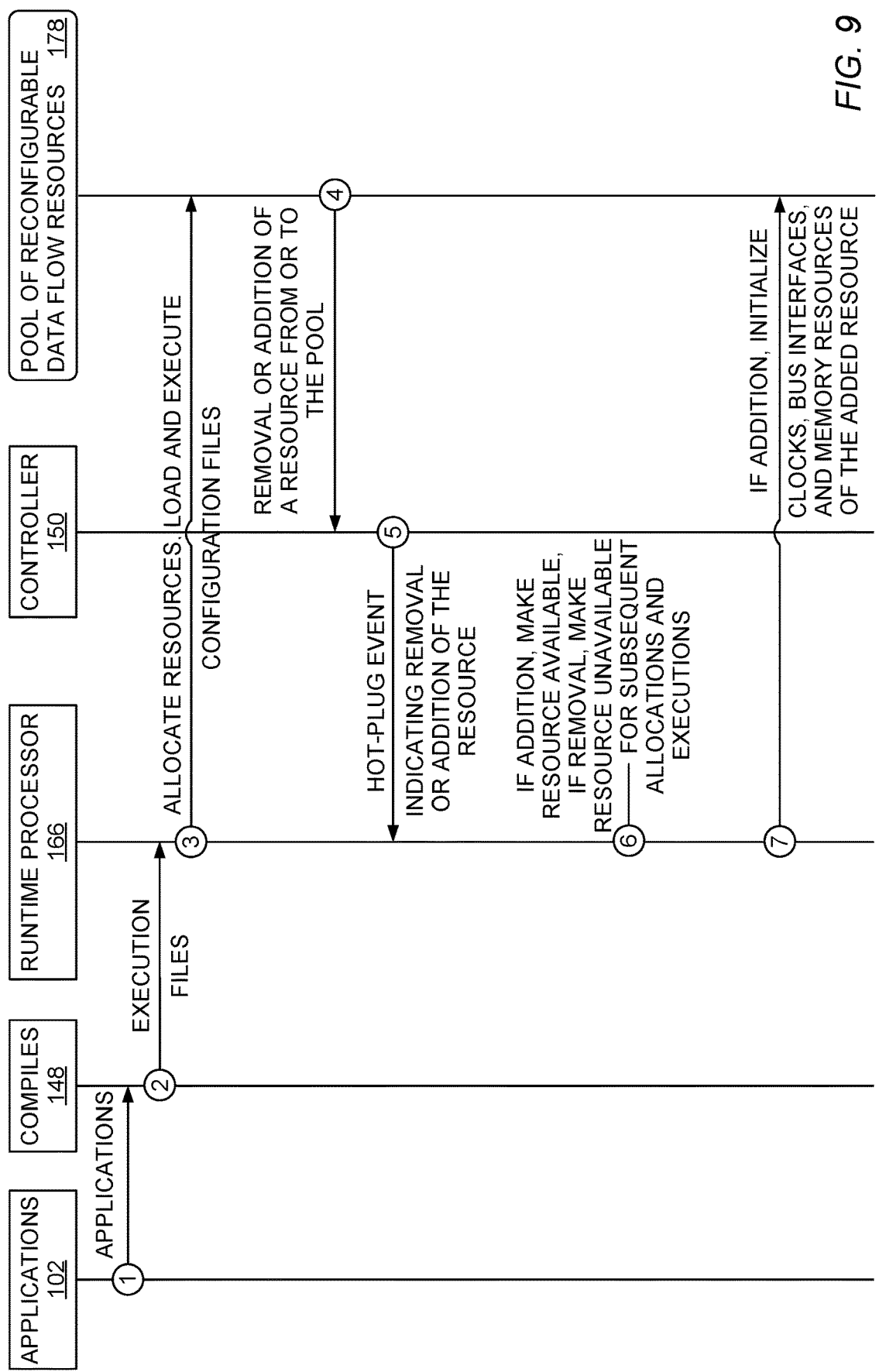
FIG. 9 is a diagram of an illustrative data exchange between various components of the illustrative data processing system according to the technology disclosed.

FIG. 9 is a diagram of an illustrative data exchange between various components of the illustrative data processing system according to the technology disclosed. FIG. 9 is described with reference to the components of FIG. 4. As mentioned above in the description of FIG. 4, the runtime processor 166 abstracts out multiple reconfigurable processor devices 180, 181, 182, 183, 184, 185, . . . 188, 489 in the pool of reconfigurable data flow resources 178, including their hardware resources (e.g., arrays of configurable units, DMA channels, and device memory), into a single virtual reconfigurable processor device for the user applications (e.g., user applications 102 of FIG. 1) running in the user space 350.

The kernel module 322 dynamically discovers reconfigurable processor devices 180, 181, 182, 183, 184, 185, . . . 188, 489 in the pool of reconfigurable data flow resources 178 during module initialization and presents them as a single virtual device /dev/rdu to the user applications running in the user space 350. As a result, each reconfigurable processor device 180, 181, 182, 183, 184, 185, . . . 188, 489 acts as a core and each array of configurable units (e.g., tile) 190, 191, 192, 193, 194, 195, . . . 198, 499 acts a hardware thread, which can be dynamically allocated to a process by the resource manager 471 of the kernel module 322. The runtime library 312 of runtime processor 166 opens /dev/rdu with an open system call.

At action 1 of FIG. 9, the compiler 148 receives the applications 102. The compiler 148 then generates the execution file (e.g., execution file 156 of FIG. 1). At action 2, the runtime processor 166 receives the execution file from the compiler 148. At action 3, the runtime processor 166 allocates resources in the pool of reconfigurable data flow resources 178 for execution of the execution files, loads configuration files from the execution files onto the allocated resources, and executes the configurations files using the resources in the pool of reconfigurable resources 178.

Illustratively, the runtime processor 166 may perform the following tasks during action 3: For example, the runtime library 312 may parse the execution file 156 and determine the configuration of virtual data flow resources required to execute the configuration files for the applications 102. The runtime library 312 may generates a data structure (e.g., a file descriptor generated by an open system call) that identifies the virtual data flow resources as the computational needs of a computation graph to be loaded. The runtime library 312 may then use the file descriptor returned by the open system call to issue an IOCTL system call to the kernel 322 with the computational needs of the particular computation graph to be loaded. The resource manager 471 may field this request by isolating and allocating the needed physical resources from the pool of available resources 178. The resource manager 471 may generate a context structure that identifies the physical resources allocated to a particular process (computation graph) and place the context structure in a corresponding file pointer's private data. The device driver 474 may use the context structure to create a contiguous memory map comprising various partitioned regions in response to resource allocation requests. Since only allocated hardware resources are memory mapped, the resource manager 471 may provide isolation amongst applications 102, and applications 102 do not have access outside of the mapped region thus securing hardware resources in a multi-user environment. The allocated physical resources to a computation graph, including tiles, DMA channels, and device memory, can be managed either in user space 350 or in kernel space 360. In user mode, the user process calls mmap system call, and a virtualized view of the allocated reconfigurable data flow resources becomes accessible in the process' virtual memory. This eliminates user-kernel context switching during graph execution. In the kernel mode, the reconfigurable data flow resource accesses stay in kernel space 360 and user processes interface with their respective compute resources via coarse grained IOCTL calls or lockless command/result ring buffers. Finally, a finite state machine may be generated by the runtime library 312, which may be used to load and run the configuration files for the applications 102 onto the reconfigurable processors 180, 181, 182, 183, 184, 185, . . . 188, 489. This also includes transferring configuration data to the reconfigurable processors using control and status registers. The control and status registers may be present in almost all the hardware units (e.g., PCIe channel controllers, DDR channel controllers, tile components like a AGCUs, PMUs, etc.), and may be accessed by the runtime library 312 to read error status, configure hardware capabilities, and initiate hardware operations (like loading a bit file).

At action 4, a resource may be removed from or added to the pool of reconfigurable data flow resources 178, and the controller 150 may detect that the resource has been removed from or added to the pool of reconfigurable data flow resources 178. As an example, a reconfigurable processor of reconfigurable processors 180, 181, 182, 183, 184, 185, . . . 188, 489 and the associated arrays of physical configurable units has been removed from the pool of reconfigurable data flow resources 178, and the controller 150 has detected the removal (e.g., through a status signal from the port from which the reconfigurable processor has been removed). As another example, reconfigurable processor 489 has been added to the pool of reconfigurable data flow resources 178, and the controller has detected the insertion of the additional reconfigurable data flow resource 489 (e.g., through a status signal from the port into which the reconfigurable processor has been inserted).

At action 5, the controller 150 may generate a hot-plug event that indicates the resource removal from or the resource addition to the pool of reconfigurable data flow resources 178. Illustratively, the controller 150 may generate a hot-plug removal event if a resource was removed from the pool of reconfigurable data flow resources 178 and a hot-plug insertion event if a resource as added to the pool of reconfigurable data flow resources 178.

At action 6, the runtime processor 166 may react to a hot-plug insertion event from the controller 150 by making the new resource available for subsequent allocations of subsequent virtual data flow resources and subsequent executions of subsequent user applications. Alternatively, the runtime processor 166 may react to a hot-plug removal event from the controller 150 may making the removed resource unavailable for subsequent allocation of subsequent virtual data flow resources and subsequent execution of subsequent user applications. Other reconfigurable data flow resources in the pool of reconfigurable data flow resources 178 are unaffected by the actions of the runtime processor 166 and continue execution of the corresponding user applications.

Illustratively, the hot-plug event is transmitted to a module in the runtime processor via interface 155 as an interrupt. As an example, the hot-plug event may be received by the kernel module 322, which may transmit the hot-plug event as an interrupt to the daemon module 401 in the user space 350. As another example, the kernel module 322 may receive the hot-plug event and generate an internal interrupt.

At action 7, the runtime processor 166 may initialize clocks, bus interfaces, and memory resources of the added resource in response to receiving a hot-plug insertion event. For example, the module (e.g., the daemon module 401 or the kernel module 322) may be configured to respond to the interrupt by executing the initialization of clocks, bus interfaces, and memory resources of the arrays of physical configurable units 499 in the respective reconfigurable data flow resource 489.

For example, the module may transmit a file descriptor data structure using an input-output control (IOCTL) system call, whereby the file descriptor data structure specifies the initialization of the clocks, the bus interfaces, and the memory resources of the arrays of physical configurable units 499 in the respective reconfigurable data flow resource 489. Illustratively, the bus interfaces include at least one of a peripheral component interconnect express (PCIe) channel, a direct memory access (DMA) channel, a double data rate (DDR) channel, an InfiniBand channel, or an Ethernet channel. By way of example, the memory resources include at least one of a main memory, a local secondary storage, or a remote secondary storage.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A data processing system, comprising:
a pool of reconfigurable data flow resources, reconfigurable data flow resources in the pool of reconfigurable data flow resources including arrays of physical configurable units;
a controller that is connected to the pool of reconfigurable data flow resources and configured to generate a hot-plug event in response to detecting a removal of at least one array of physical configurable units of the arrays of physical configurable units from the pool of reconfigurable data flow resources; and
a runtime processor that is connected to the controller, operatively coupled to the pool of reconfigurable data flow resources, and configured to:
receive a plurality of configuration files for user applications, configuration files in the plurality of configuration files including configurations of virtual data flow resources required to execute the user applications;
allocate a subset of the arrays of physical configurable units in the pool of reconfigurable data flow resources to the virtual data flow resources;
load the configuration files to the subset of the arrays of physical configurable units;
start execution of the user applications on the subset of the arrays of physical configurable units;
receive the hot-plug event from the controller indicating the removal of the at least one array of physical configurable units from the pool of reconfigurable data flow resources, wherein the at least one array of physical configurable units is unallocated; and
make the at least one array of physical configurable units unavailable for subsequent allocations of subsequent virtual data flow resources and subsequent executions of subsequent user applications, while the subset of the arrays of physical configurable units continues the execution of the user applications.

2. The data processing system of claim 1, wherein the removal of the at least one array of physical configurable units of the arrays of physical configurable units from the pool of reconfigurable data flow resources is reactive to an error event in the at least one array of physical configurable units.

3. The data processing system of claim 1, wherein the controller is configured to generate an additional hot-plug event in response to detecting an addition of an other array of physical configurable units to the pool of reconfigurable data flow resources, wherein the other array of physical configurable units is at least one of a previously removed array of physical configurable units from the pool of reconfigurable data flow resources or a newly added array of physical configurable units, and wherein the runtime processor is further configured to:
receive the additional hot-plug event from the controller indicating the addition of the other array of physical configurable units to the pool of reconfigurable data flow resources, wherein the other array of physical configurable units is unallocated; and
make the other array of physical configurable units available for the subsequent allocations of the subsequent virtual data flow resources and the subsequent executions of the subsequent user applications, while the subset of the arrays of physical configurable units continues execution of the user applications.

4. The data processing system of claim 3, wherein the additional hot-plug event is transmitted to a module in the runtime processor as an interrupt, and wherein the module is configured to respond to the interrupt by executing an initialization of clocks, bus interfaces, and memory resources of the other array of physical configurable units.

5. The data processing system of claim 4, wherein the module is further configured to respond to the interrupt by transmitting a file descriptor data structure using an input-output control (IOCTL) system call, wherein the file descriptor data structure specifies the initialization of the clocks, the bus interfaces, and the memory resources of the other array of physical configurable units.

6. The data processing system of claim 4, wherein the bus interfaces include at least one of a peripheral component interconnect express (PCIe) channel, a direct memory access (DMA) channel, a double data rate (DDR) channel, an InfiniBand channel, or an Ethernet channel.

7. The data processing system of claim 4, wherein the memory resources include at least one of a main memory, a local secondary storage, or a remote secondary storage.

8. The data processing system of claim 1, wherein the controller is configured to generate an additional hot-plug event in response to detecting an addition of a virtual function on an initialized array of physical configurable units in the pool of reconfigurable data flow resources, and wherein the runtime processor is further configured to:
receive the additional hot-plug event from the controller indicating the addition of the virtual function on the initialized array of physical configurable units in the pool of reconfigurable data flow resources; and
make the virtual function available for the subsequent allocation of the subsequent virtual data flow resources and the subsequent execution of the subsequent user applications, while the subset of physical configurable units continues execution of the user applications.

9. The data processing system of claim 8, wherein the virtual function is initialized using a single-root input-output virtualization (SR-IOV) interface.

10. The data processing system of claim 8, wherein the additional hot-plug event is transmitted to a module in the runtime processor as an interrupt, and wherein the module is configured to respond to the interrupt by
executing an initialization of the virtual function; and
transmitting a file descriptor data structure using an input-output control (IOCTL) system call, wherein the file descriptor data structure specifies the initialization of the virtual function.

11. The data processing system of claim 1, wherein the controller is configured to generate an additional hot-plug event in response to detecting a removal of an allocated array of physical configurable units from the subset of physical configurable units, and wherein the runtime processor is further configured to:
receive the additional hot-plug event from the controller indicating the removal of the allocated array of physical configurable units from the subset of physical configurable units; and
stop the execution of the user applications on the allocated array of physical configurable units, and
make the allocated array of physical configurable units unavailable for the subsequent allocation of the subsequent virtual data flow resources and the subsequent execution of the subsequent user applications, while other allocated arrays of physical configurable units in the subset of physical configurable units continue the execution of the user applications.

12. The data processing system of claim 11, wherein the additional hot-plug event is transmitted to a module in the runtime processor as an interrupt, and wherein the module is configured to respond to the interrupt by transmitting a file descriptor data structure using an input-output control (IOCTL) system call, wherein the file descriptor data structure specifies that the allocated array of physical configurable units is unavailable for the subsequent allocation of the subsequent virtual data flow resources and the subsequent execution of the subsequent user applications.

13. The data processing system of claim 1, wherein the controller is configured to generate an additional hot-plug event in response to detecting a removal of an allocated array of physical configurable units that implements an allocated virtual function, and wherein the runtime processor is further configured to:

receive the additional hot-plug event from the controller indicating the removal of the allocated array of physical configurable units that implements the allocated virtual function; and stop the execution of the user applications on the allocated virtual function, and make the allocated virtual function unavailable for the subsequent allocation of the subsequent virtual data flow resources and the subsequent execution of the subsequent user applications, while other allocated arrays of physical configurable units in the subset of physical configurable units continue the execution of the user applications.

14. The data processing system of claim 13, wherein the additional hot-plug event is transmitted to a module in the runtime processor as an interrupt, and wherein the module is configured to respond to the interrupt by transmitting a file descriptor data structure using an input-output control (IOCTL) system call, wherein the file descriptor data structure specifies that the allocated virtual function is unavailable for the subsequent allocation of the subsequent virtual data flow resources and the subsequent execution of the subsequent user applications.

15. The data processing system of claim 1, wherein the runtime processor comprises:

a daemon module;

a kernel module; and a fault management module that is configured to determine that a memory resource of a plurality of memory resources of an allocated array of physical configurable units in the pool of reconfigurable data flow resources is in a faulty state; and transmit a file descriptor data structure to the kernel module using an input-output control (IOCTL) system call, wherein the file descriptor data structure specifies that the memory resource of the plurality of memory resources of the allocated array of physical configurable units in the pool of reconfigurable data flow resources is in the faulty state.

16. The data processing system of claim 15, wherein the kernel module is configured to respond to the IOCTL system call by putting the allocated array of physical configurable units in a drain mode, wherein in the drain mode, after the execution of the user applications on the allocated array of physical configurable units, the kernel module removes the allocated array of physical configurable units from the pool of reconfigurable data flow resources, thereby transforming the allocated array of physical configurable units into an unavailable array of physical configurable units that is unavailable for the subsequent allocation of the subsequent virtual data flow resources and the subsequent execution of the subsequent user applications.

17. The data processing system of claim 16, wherein the kernel module is configured to transmit an interrupt to the daemon module, wherein the interrupt requests a reconfiguration of the plurality of memory resources of the unavailable array of physical configurable units without the memory resource that is in the faulty state.

18. The data processing system of claim 17, wherein the daemon module is configured to execute the reconfiguration of the plurality of memory resources of the unavailable array of physical configurable units without the memory resource that is in the faulty state.

19. The data processing system of claim 18, wherein the daemon module is further configured to transmit a file descriptor data structure to the kernel module using an input-output control (IOCTL) system call, wherein the file descriptor data structure specifies the reconfiguration of the plurality of memory resources of the unavailable array of physical configurable units.

20. The data processing system of claim 19, wherein the kernel module is configured to respond to the IOCTL system call by adding the unavailable array of physical configurable units back into the pool of reconfigurable data flow resources, thereby transforming the unavailable array of physical configurable units into an available array of physical configurable units that is available for the subsequent allocation of the subsequent virtual data flow resources and the subsequent execution of the subsequent user applications.

21. A system, comprising:

a plurality of reconfigurable devices;

a plurality of transfer resources that interconnects the plurality of reconfigurable devices and enables the plurality of reconfigurable devices to receive and send data;

a plurality of storage resources usable by the plurality of reconfigurable devices to store data;

a controller that is connected to the plurality of transfer resources and configured to generate a hot-plug event in response to detecting a removal of at least one reconfigurable device of the plurality of reconfigurable devices from the plurality of transfer resources; and a runtime processor configured with logic to control execution of a plurality of application graphs based on an execution file, the execution file including configuration files for application graphs in the plurality of application graphs, reconfigurable devices in the plurality of reconfigurable devices required to load and execute the configuration files, and resource requests for transfer resources in the plurality of transfer resources and storage resources in the plurality of storage resources required to satisfy data and control dependencies of the application graphs;

allocate the reconfigurable devices to the application graphs;

allocate the transfer resources and the storage resources to the application graphs based on the resource requests;

load the configuration files to the reconfigurable devices;

start execution of the configuration files using the reconfigurable devices, transfer resources, and storage resources;

receive the hot-plug event from the controller indicating the removal of the at least one reconfigurable device from the plurality of transfer resources, wherein the at least one reconfigurable device is unallocated; and make the at least one reconfigurable device unavailable for subsequent allocations to subsequent application graphs, while the reconfigurable devices, the transfer resources, and the storage resources continue the execution of the configuration files.

* * * * *